US010210626B2

(12) United States Patent
Chiba et al.

(10) Patent No.: US 10,210,626 B2
(45) Date of Patent: Feb. 19, 2019

(54) REGISTER ERROR AMOUNT DETECTION METHOD AND APPARATUS

(71) Applicant: Komori Corporation, Tokyo (JP)

(72) Inventors: Takeshi Chiba, Tsukuba (JP); Yuki Matsuda, Tsukuba (JP)

(73) Assignee: KOMORI CORPORATION, Tokyo (JP)

(*) Notice: Subject to any disclaimer, the term of this patent is extended or adjusted under 35 U.S.C. 154(b) by 129 days.

(21) Appl. No.: 15/260,060

(22) Filed: Sep. 8, 2016

(65) Prior Publication Data
US 2017/0069100 A1 Mar. 9, 2017

(30) Foreign Application Priority Data

Sep. 9, 2015 (JP) .................................. 2015-177260
Oct. 30, 2015 (JP) .................................. 2015-214072

(51) Int. Cl.
G06K 9/46 (2006.01)
G06T 7/90 (2017.01)
G06T 7/60 (2017.01)
G06T 7/11 (2017.01)
B41F 33/00 (2006.01)

(52) U.S. Cl.
CPC ............ *G06T 7/60* (2013.01); *B41F 33/0081* (2013.01); *G06K 9/4652* (2013.01); *G06T 7/11* (2017.01); *G06T 7/90* (2017.01); *B41P 2233/52* (2013.01); *G06T 2207/10024* (2013.01); *G06T 2207/30144* (2013.01); *G06T 2207/30204* (2013.01)

(58) Field of Classification Search
None
See application file for complete search history.

(56) References Cited

U.S. PATENT DOCUMENTS 5,056,430 A 10/1991 Bayerlein et al.
6,109,183 A * 8/2000 Papritz ............... B41F 33/0081
101/181

(Continued)

FOREIGN PATENT DOCUMENTS

CN 101003202 A 7/2007
CN 102079160 A 6/2011

(Continued)

OTHER PUBLICATIONS

Search Report in European Application No. 16187518.2 dated Feb. 20, 2017. 8 pages.

(Continued)

*Primary Examiner* — Matthew C Bella
*Assistant Examiner* — Jose Torres
(74) *Attorney, Agent, or Firm* — Womble Bond Dickinson (US) LLP

(57) ABSTRACT

A register error amount detection apparatus obtains the register error amounts between the colors of patterns printed on a printing product based on the positions of register marks in a captured image of the printing product. The register marks have different colors including a reference color and are printed in a line at intervals a in the vertical direction. The register marks all have the reference color and are printed in a line at the intervals a in the vertical direction at positions translated from the positions of the register marks by a distance b in the horizontal direction.

16 Claims, 29 Drawing Sheets

(56) References Cited

U.S. PATENT DOCUMENTS

| | | | |
|---|---|---|---|
| 7,253,929 B2 * | 8/2007 | Wendel | B41F 33/0081 250/208.1 |
| 2012/0194593 A1 * | 8/2012 | Kurata | B41F 33/0045 347/15 |

FOREIGN PATENT DOCUMENTS

| | | |
|---|---|---|
| CN | 102529451 A | 7/2012 |
| CN | 103108753 A | 5/2013 |
| EP | 2 439 072 A1 | 4/2012 |
| JP | 2006 256216 A | 9/2006 |
| JP | 2006-525144 A | 11/2006 |
| JP | 2011-110885 A | 6/2011 |
| JP | 2012-068080 A | 4/2012 |

OTHER PUBLICATIONS

Arai et al., "Optimization of Correlation Function and Sub-Pixel Estimation Method on Block Matching", IPSJ SIG Computer Vison and Image Media (CVIM), 2004 (40(2004-CVIM-144)), May 6, 2004, pp. 33-40.

Office Action received for Chinese Patent Application No. 201610811425.X, dated May 24, 2018, 21 pages (11 pages of English Translation and 10 pages of Office Action).

* cited by examiner

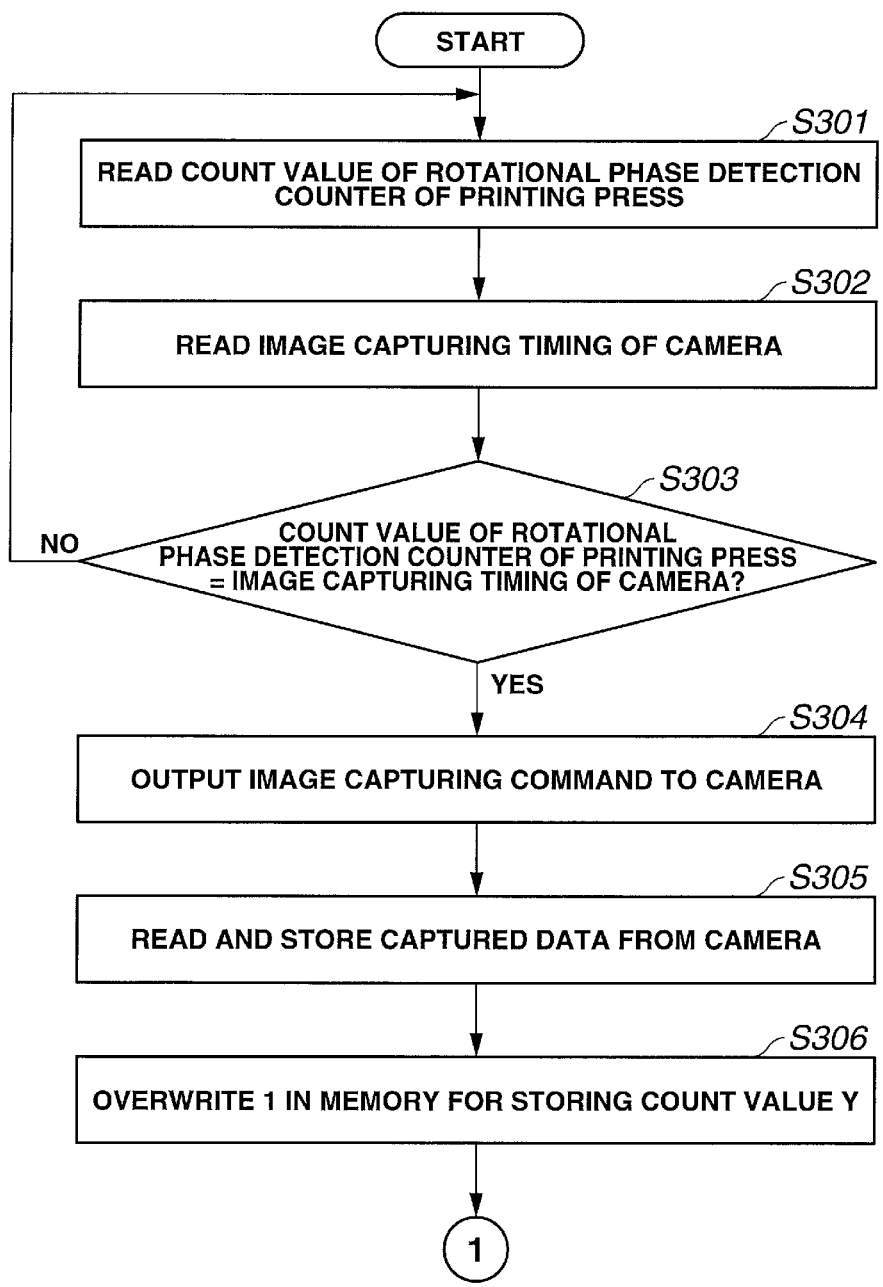

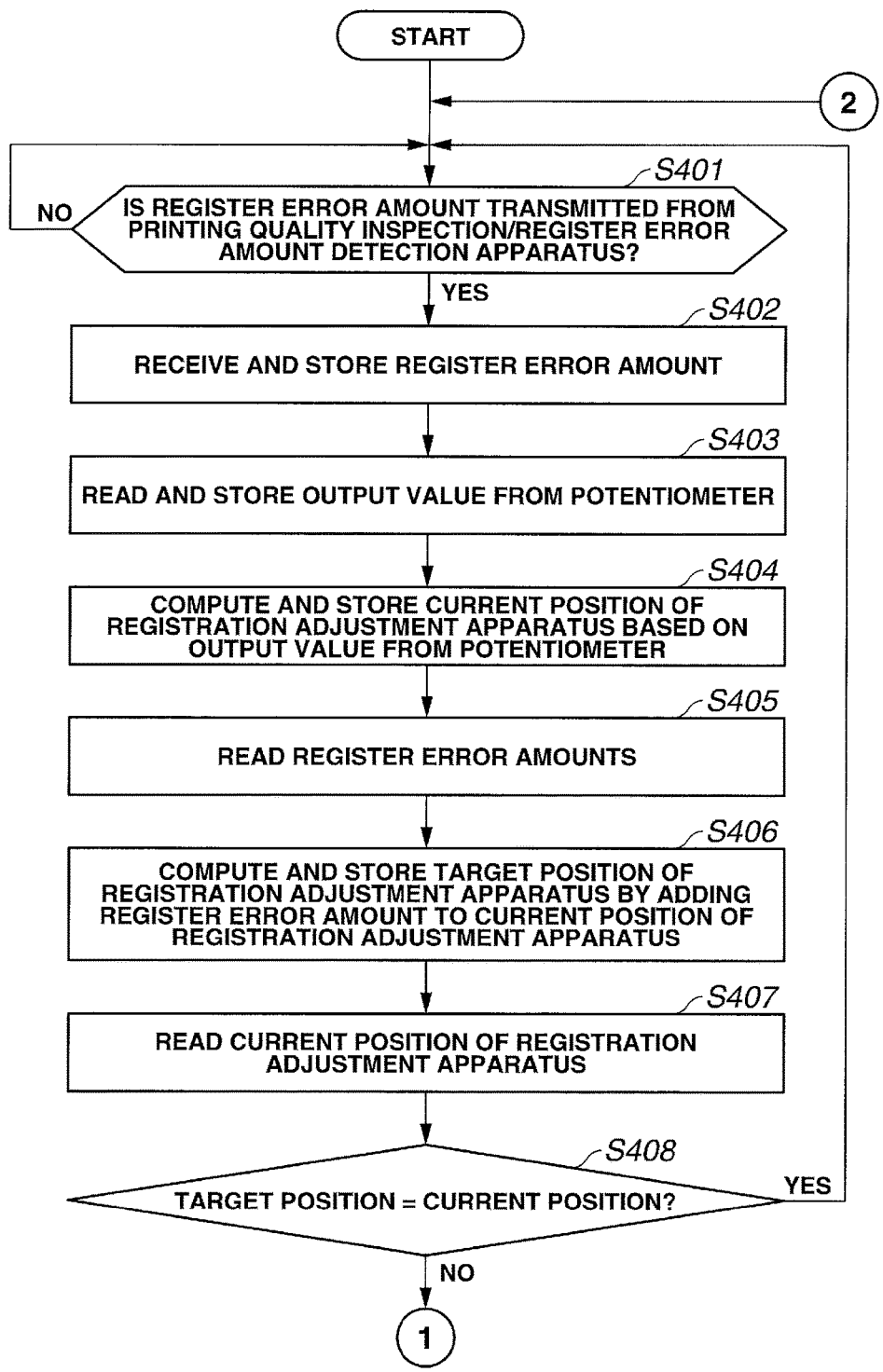

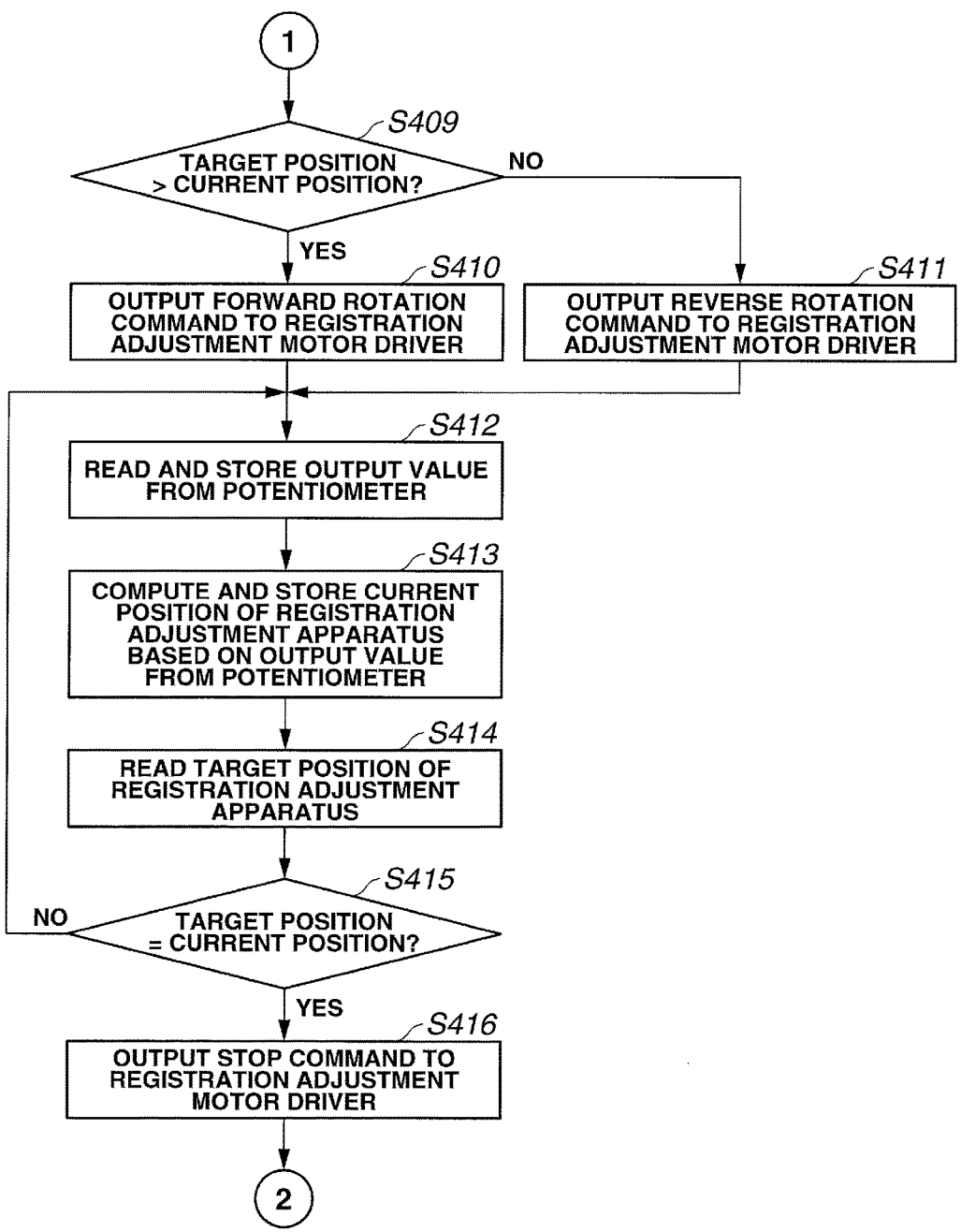

REGISTER ERROR AMOUNT DETECTION METHOD AND APPARATUS

BACKGROUND OF THE INVENTION

The present invention relates to a register error amount detection method and apparatus which obtain register error amounts between the colors of patterns printed on a printing product based on the positions of register marks.

For example, in an offset printing press, a printing plate on which patterns are printed is wound around a plate cylinder, and ink retained in an ink fountain is transferred onto the printing plate via an ink roller group. The ink transferred onto this printing plate is transferred to a blanket cylinder which rotates in tight contact with the plate cylinder, and a printing sheet is fed through between this blanket cylinder and an impression cylinder, thereby printing on the sheet. When performing multicolor printing, a plurality of printing units each including an ink fountain, an ink roller group, a plate cylinder, a blanket cylinder, and an impression cylinder are disposed for the respective colors, and a printing sheet is sequentially fed to the printing units for the respective colors to perform printing.

In this multicolor printing press, if the position of the printing plate wound around the plate cylinder of the printing unit for each color is shifted from a proper position, positional shifts (register errors) occur between patterns of the respective colors on a finished printing product in the vertical direction (the printing direction (the traveling direction of the printing product) in the printing press) and the horizontal direction (the direction perpendicular to the vertical direction).

Under the circumstance, Japanese patent Laid-Open No. 2011-110885 (literature 1) discloses a printing press which performs inline registration as follows. When printing patterns of a plurality colors, this printing press simultaneously prints a register mark of each color in a margin of a printing product, and captures an image of a region including the register mark of each color by using a high-resolution camera. The printing press obtains the position of the register mark of each color in the captured image data, and obtains the register error amounts between the colors of the patterns printed on the printing product based on the obtained positions of the register marks of the respective colors. The printing press then adjusts the rotational phase of the plate cylinder, the horizontal position of the plate cylinder, and the like in the printing unit for each color based on the obtained register error amounts between the colors.

This method, however, requires a dedicated camera, and hence requires expensive equipment. In contrast to this, studies have been conducted to use the camera of a printing quality inspection apparatus. According to this technique, the position of a register mark of each color is detected from image data captured by this camera, and register error amounts between colors are obtained. The printing quality inspection apparatus is designed to capture with a camera an image of a region including an overall pattern region on a printing product on which patterns of a plurality of colors are printed and inspect the quality of each pattern printed on the printing product by using the captured image data of each pattern. Japanese patent Laid-Open No. 2012-68080 (literature 2) discloses such a printing quality inspection apparatus. Japanese patent Laid-Open No. 2006-525144 (literature 3) discloses a technique of detecting register marks by using the camera of a printing quality inspection apparatus.

As described, however, the camera used in a printing quality inspection apparatus needs to capture an image of an overall pattern region on a printing product, and hence needs to capture an image in a wide range. Inevitably, therefore, this camera performs image capturing at a wide angle. As a result, a large chromatic aberration, image distortion, and the like occur in a range near an end portion of a lens. For this reason, in a captured image, each side of a register mark of each color blurs to result in failure to accurately detect register error amounts between the respective colors. This problem will be described by using a registration measurement mark MR shown in FIG. 20.

The registration measurement mark MR is constituted by a black register mark R1, a cyan register mark R2, a magenta register mark R3, and a yellow register mark R4. The register marks R1 to R4 are printed at predetermined intervals in the vertical or horizontal direction of a printing product. In this case, "black" is a color as a reference (to be also referred to as a reference color hereinafter), and the register marks R1 to R4 are printed at predetermined intervals in the vertical direction (Y direction).

The registration measurement mark MR is used as follows. The positions of the register marks R1 to R4 of the respective colors are detected. Relative distances L1, L2, and L3 between the register mark R1 of the reference color and the register marks R2, R3, and R4 of the remaining colors in the vertical direction (Y direction) are obtained. Register error amounts $\Delta y1$, $\Delta y2$, and $\Delta y3$ of the remaining colors with respect to the reference color in the vertical direction (Y direction) are obtained from the differences between the obtained relative distances L1, L2, and L3 in the vertical direction (Y direction) and predetermined reference distances L1$r$, L2$r$, and L3$r$. Likewise, although not shown in FIG. 20, register error amounts $\Delta x1$, $\Delta x2$, and $\Delta x3$ of the remaining colors with respect to the reference color in the horizontal direction (X direction) are obtained. The register error amounts of the remaining colors with respect to the reference color obtained in this manner correspond to the register error amounts between the respective colors.

When capturing an image of the registration measurement mark MR by using the camera of a printing quality inspection apparatus, the camera of the printing quality inspection apparatus performs image capturing at a wide angle. This causes a large chromatic aberration and image distortion in a range near an end portion of the lens. For this reason, each side of each of the register marks R1 to R4 of the respective colors constituting the registration measurement mark MR blurs. This makes the detected positions of the register marks R1 to R4 of the respective color inaccurate, resulting in a reduction in the accuracy of the register error amounts between the respective colors which are obtained from the detected positions of the register marks R1 to R4 of the respective colors.

SUMMARY OF THE INVENTION

It is therefore an object of the present invention to provide a register error amount detection method and apparatus which can accurately detect the register error amounts between colors even by using a camera designed to perform image capturing at a wide angle.

According to an aspect of the present invention, there is provided a register error amount detection method including the step of reading a captured image from an image capturing apparatus which captures an image of a region including a registration measurement mark printed in a margin of a printing product, the registration measurement mark including a first register mark group including a plurality of first register marks of different colors including a reference color and a second register mark group including a plurality of second register marks of the reference color, the plurality of second register marks being equal in number to the plurality of first register marks, the plurality of first register marks being printed in a line at predetermined intervals in a first direction which is a vertical direction or horizontal direction of the printing product, and the plurality of second register marks being printed in a line at the predetermined intervals in the first direction at positions translated from the positions of the plurality of first register marks by a predetermined distance in a second direction perpendicular to the first direction, and the step of obtaining register error amounts between colors of patterns printed on the printing product based on positions of the plurality of first register marks and the plurality of second register marks in the read captured image.

According to another aspect of the present invention, there is provided a register error amount detection apparatus including captured image reading means for reading a captured image from an image capturing apparatus which captures an image of a region including a registration measurement mark printed in a margin of a printing product, the registration measurement mark including a first register mark group including a plurality of first register marks of different colors including a reference color and a second register mark group including a plurality of second register marks of the reference color, the plurality of second register marks being equal in number to the plurality of first register marks, the plurality of first register marks being printed in a line at predetermined intervals in a first direction which is a vertical direction or horizontal direction of the printing product, and the plurality of second register marks being printed in a line at the predetermined intervals in the first direction at positions translated from the positions of the plurality of first register marks by a predetermined distance in a second direction perpendicular to the first direction, and register error amount detection means for obtaining register error amounts between colors of patterns printed on the printing product based on positions of the plurality of first register marks and the plurality of second register marks in the read captured image.

BRIEF DESCRIPTION OF THE DRAWINGS

FIGS. 17A to 17F are flowcharts showing the schematic operation of the printing quality inspection/register error amount detection apparatus shown in FIG. 14;

FIGS. 19A and 19B are flowcharts showing the registration adjustment operation of the registration adjustment apparatus shown in FIG. 18.

DESCRIPTION OF THE PREFERRED EMBODIMENTS

The embodiments of the present invention will be described in detail below with reference to the accompanying drawings. A basic example of the embodiments of the present invention will be described first as the first embodiment.

[First Embodiment]

Figure 1:
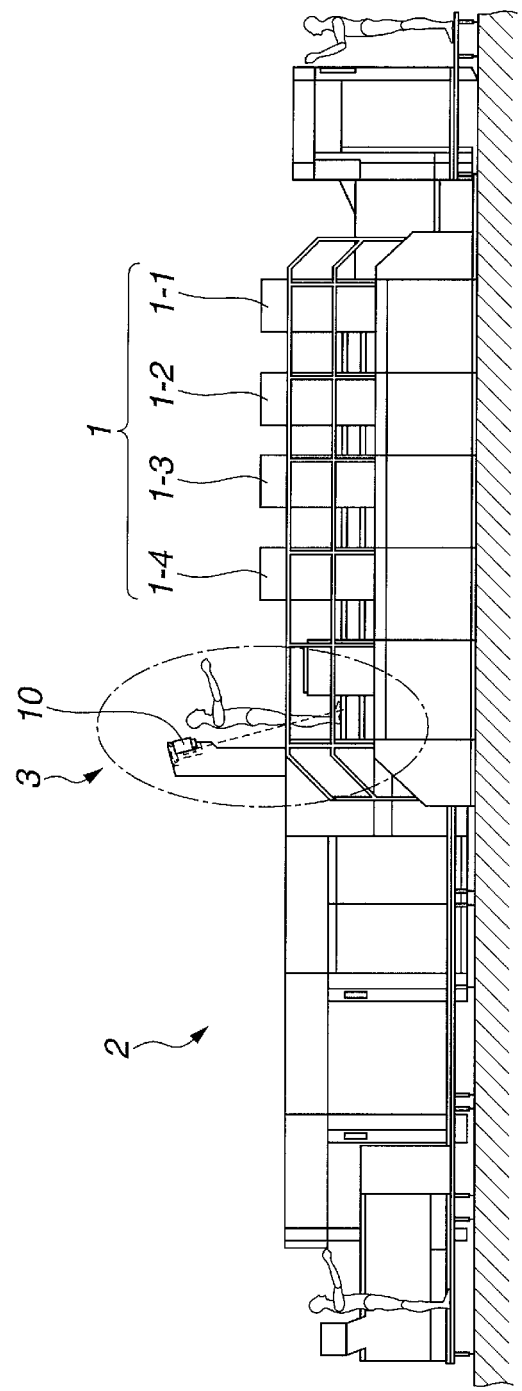
FIG. 1 is a side view schematically showing the arrangement of a sheet-fed rotary printing press.

FIG. 1 schematically shows the arrangement of a sheet-fed rotary printing press. This printing press is a four-color printing press, and includes four printing units 1 (1-1 to 1-4) which print different colors on a printing sheet. For example, the printing units 1-1 to 1-4 respectively print black, cyan, magenta, and yellow.

Figure 2:
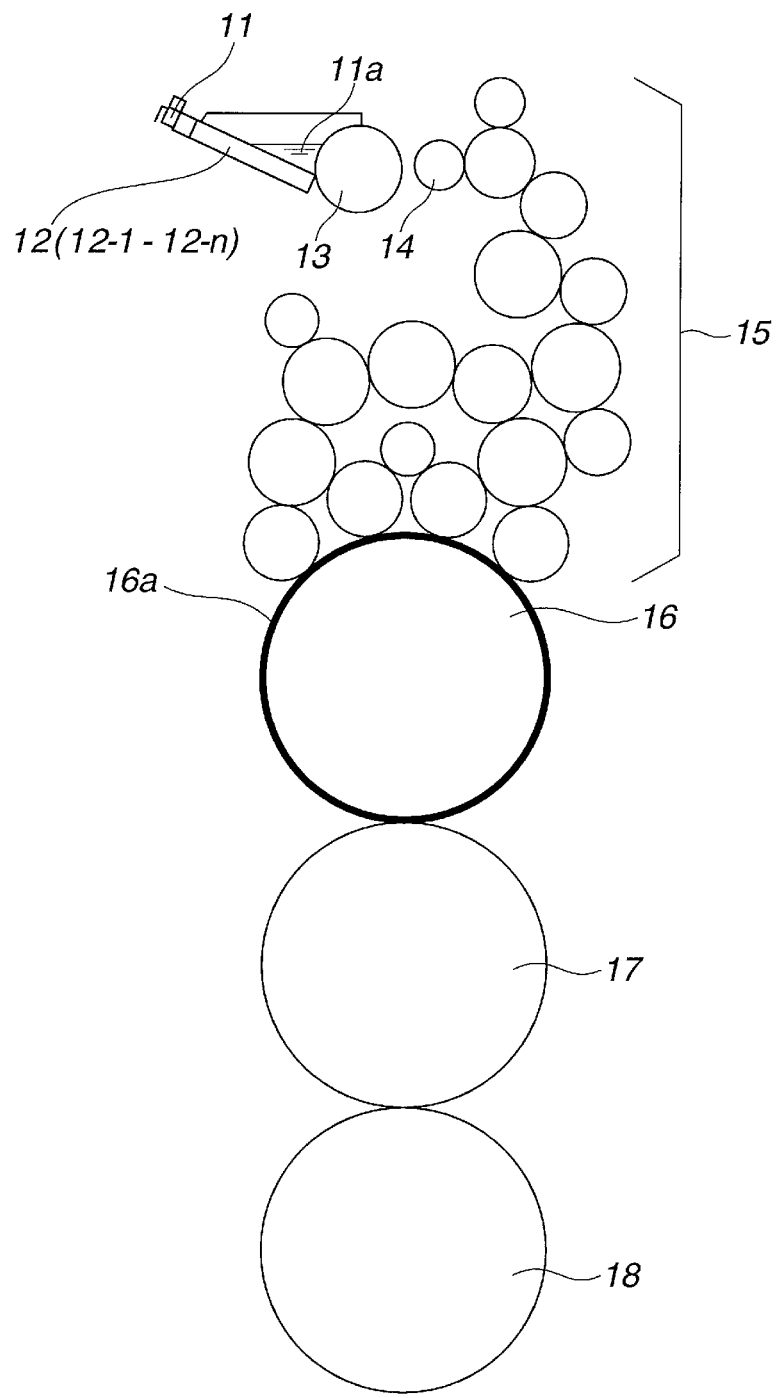
FIG. 2 is a view showing the structure of a printing unit of each color in the sheet-fed rotary printing press shown in FIG. 1.

As shown in FIG. 2, the printing units 1-1 to 1-4 each include an ink fountain 11, a plurality of ink fountain keys 12 (12-1 to 12-n), an ink fountain roller 13, an ink ductor roller 14, an ink roller group 15, a plate cylinder 16, a blanket cylinder 17, and an impression cylinder 18. The ink fountain 11 stores ink 11a of any one of the colors "black", "cyan", "magenta", and "yellow". A printing plate 16a on which patterns are printed is attached to the plate cylinder 16.

The ink fountain keys 12-1 to 12-n are juxtaposed in the axial direction of the ink fountain roller 13. The amount of the ink 11a supplied from the inside of the ink fountain 11 to the ink fountain roller 13 is adjusted by changing the opening ratio between the ink fountain keys 12-1 to 12-n and the ink fountain roller 13. Changing the feed rate of the ink fountain roller 13 will adjust the amount of the ink 11a supplied from the ink fountain roller 13 to the printing plate 16a through the ink ductor roller 14 and the ink roller group 15.

Figure 3:
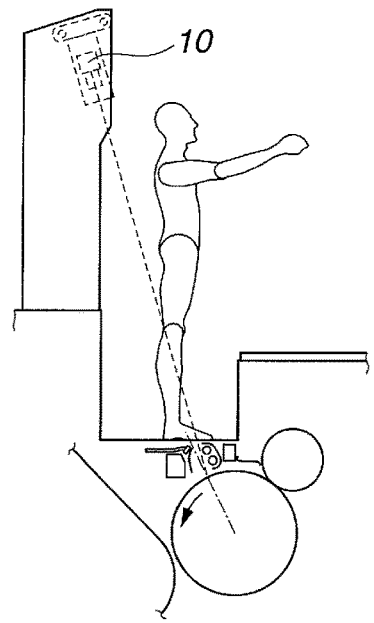
FIG. 3 is an enlarged view of the installation position of the color camera of a printing quality inspection apparatus in the sheet-fed rotary printing press shown in FIG. 1.

As shown in FIG. 1, this printing press further includes a color camera 10 as an image capturing apparatus arranged midway along a printing product convey path extending from the last printing unit 1-4 to a delivery unit 2. As shown in FIG. 3, the color camera 10 captures an image of patterns on a printing product to be fed to the delivery unit 2 upon printing by the printing units 1-1 to 1-4 from above. The color camera 10 is provided as the camera of a printing quality inspection apparatus 3 which inspects the quality of each pattern printed on a printing product. The printing quality inspection apparatus 3 is an apparatus which captures, with the color camera 10, an image of a region including an overall pattern region on a printing product on which patterns of a plurality of colors are printed, and inspects the quality of each pattern printed on the printing product by comparing the image data of the captured pattern image with reference image data stored in advance for each pixel. The first embodiment uses the color camera 10 also as a camera for detecting the register error amounts between colors.

In this printing press, in the printing unit 1 for each color, the ink 11a in the ink fountain 11 is supplied from between the ink fountain keys 12-1 to 12-n and the ink fountain roller 13 to the ink fountain roller 13. The ink 11a supplied to the ink fountain roller 13 is supplied to the printing plate 16a through the ink roller group 15 by the feeding operation of the ink ductor roller 14. The ink 11a supplied to the printing plate 16a is transferred to the blanket cylinder 17 and printed on a printing sheet passing between the blanket cylinder 17 and the impression cylinder 18.

Figure 4:
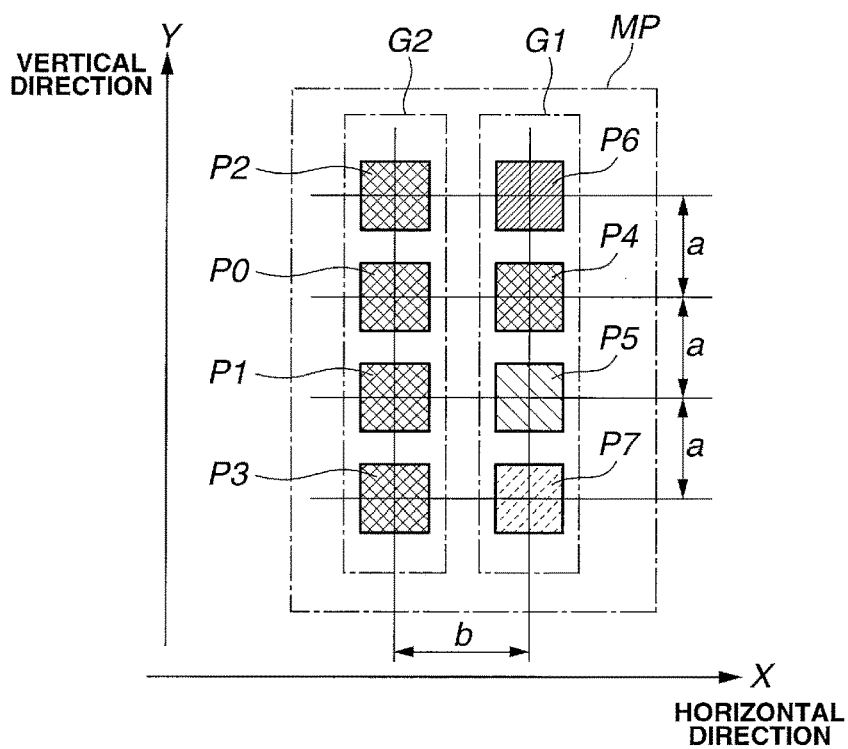
FIG. 4 is a view showing an example of a registration measurement mark used in the first embodiment (basic example) of the present invention.

A registration measurement mark is printed in a margin of this finished printing sheet (printing product). Assume that in the first embodiment, as a most basic example, only one registration measurement mark is printed in a margin of a printing product. FIG. 4 shows a registration measurement mark MP used in the first embodiment.

The registration measurement mark MP is constituted by a first register mark group G1 and a second register mark group G2. The first register mark group G1 includes register marks (first register marks) P4 to P7 of different colors including a reference color. The second register mark group G2 includes register marks (second register marks) P0 to P3 of the reference color. The number of the register marks P0 to P3 is the same as that of the register marks P4 to P7.

In the first register mark group G1, the color of the register mark P4 is "black" (reference color), the color of the register mark P5 is "cyan", the color of the register mark P6 is "magenta", and the color of the register mark P7 is "yellow". The register marks P4 to P7 of the respective colors are printed in a line at predetermined intervals a in the vertical direction (Y direction) of the printing product. Note that the array direction of the register marks P4 to P7 is called the "first direction", and a direction perpendicular to the first direction is called the "second direction". In this case, the vertical direction (Y direction) of the printing product is the first direction, and the horizontal direction (X direction) of the printing product is the second direction.

In the second register mark group G2, the colors of the register marks P0 to P3 are all "black" (reference color). The register marks P0 to P3 are printed in a line in the first direction at positions translated from those of the register marks P4 to P7 by a predetermined distance b in the second direction at the same intervals a as those of the register marks P4 to P7. The register marks P0 to P7 each have a square shape, and have the same size.

Register marks of a color corresponding to the printing plate 16a of each of the printing units 1-1 to 1-4 are printed such that the register marks P0 to P7 are printed in a margin of a printing sheet. More specifically, the black register marks P0 to P4 are formed on the printing plate 16a of the printing unit 1-1 for printing black. Of these register marks, the register marks P0 to P3 of the second register mark group G2 are arrayed in a line at the intervals a in the vertical direction (Y direction) of the printing plate 16a. The register mark P4 of the first register mark group G1 is arranged at a position spaced apart from one (the register mark P0 in this case) of the register marks P0 to P3 by the distance b in the horizontal direction (X direction) of the printing plate 16a. Note that the vertical direction (Y direction) of the printing plate 16a is called the "third direction", and a direction perpendicular to the horizontal direction (X direction), i.e., the third direction, of the printing plate 16a is called the "fourth direction".

The cyan register mark P5 is formed on the printing plate 16a of the printing unit 1-2 which prints cyan. The magenta register mark P6 is formed on the printing plate 16a of the printing unit 1-3 which prints magenta. The yellow register mark P7 is formed on the printing plate 16a of the printing unit 1-4 which prints yellow. When the printing plates 16a of the respective colors, i.e., black, cyan, magenta, and yellow, are superimposed and the resultant structure is seen from above, the register marks P5 to P7 including the black register mark P4, i.e., the register marks P4 to P7, are arranged in a line at the intervals a in the first direction.

Assume that the printing plates 16a of the respective colors on which these register marks are printed are attached at proper positions on the plate cylinders 16 of the respective colors, and the rotational phases of the plate cylinders 16 of the respective colors are matched with each other. In this case, when the printing units 1-1 to 1-4 sequentially print the respective colors on a printing sheet, the registration measurement mark MP shown in FIG. 4 is printed in a margin of the printing sheet.

Figure 5:
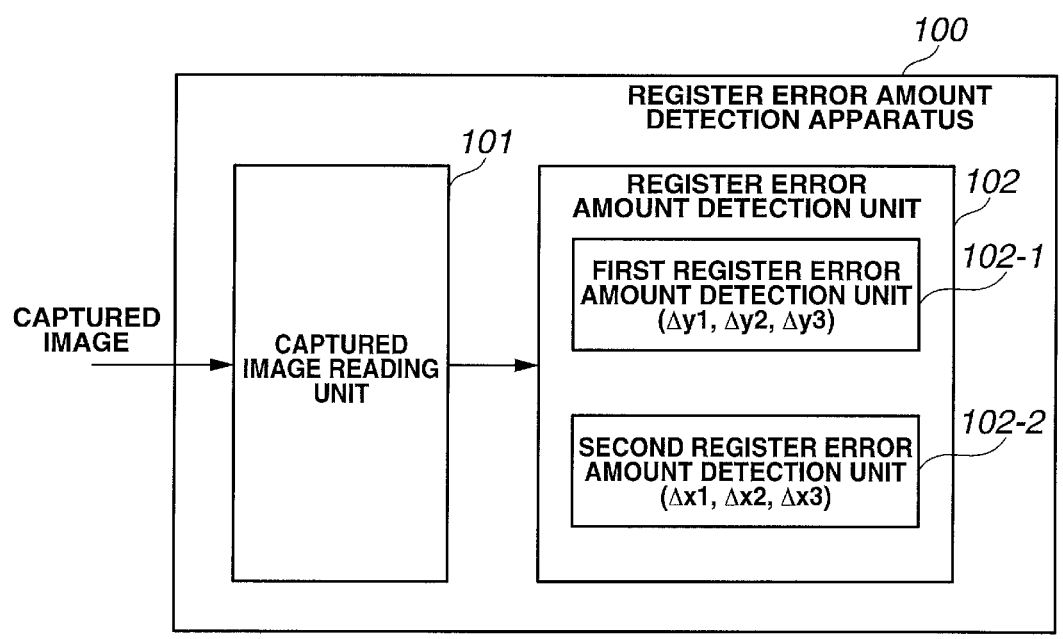
FIG. 5 is a functional block diagram of the main part of the register error amount detection apparatus according to the first embodiment of the present invention.

FIG. 5 shows the main part of the register error amount detection apparatus according to the first embodiment. A register error amount detection apparatus 100 includes a captured image reading unit 101 which reads a captured image transferred from the color camera 10 shown in FIG. 1 and a register error amount detection unit 102 which obtains the register error amounts between the colors of patterns printed on a printing product based on the positions of the register marks P0 to P7 constituting the registration measurement mark MP in the captured image read by the captured image reading unit 101. The register error amount detection unit 102 includes a first register error amount detection unit 102-1 which obtains the register error amounts between the colors in the vertical direction (Y direction) and a second register error amount detection unit 102-2 which obtains the register error amounts between the colors in the horizontal direction (X direction).

Figure 6:
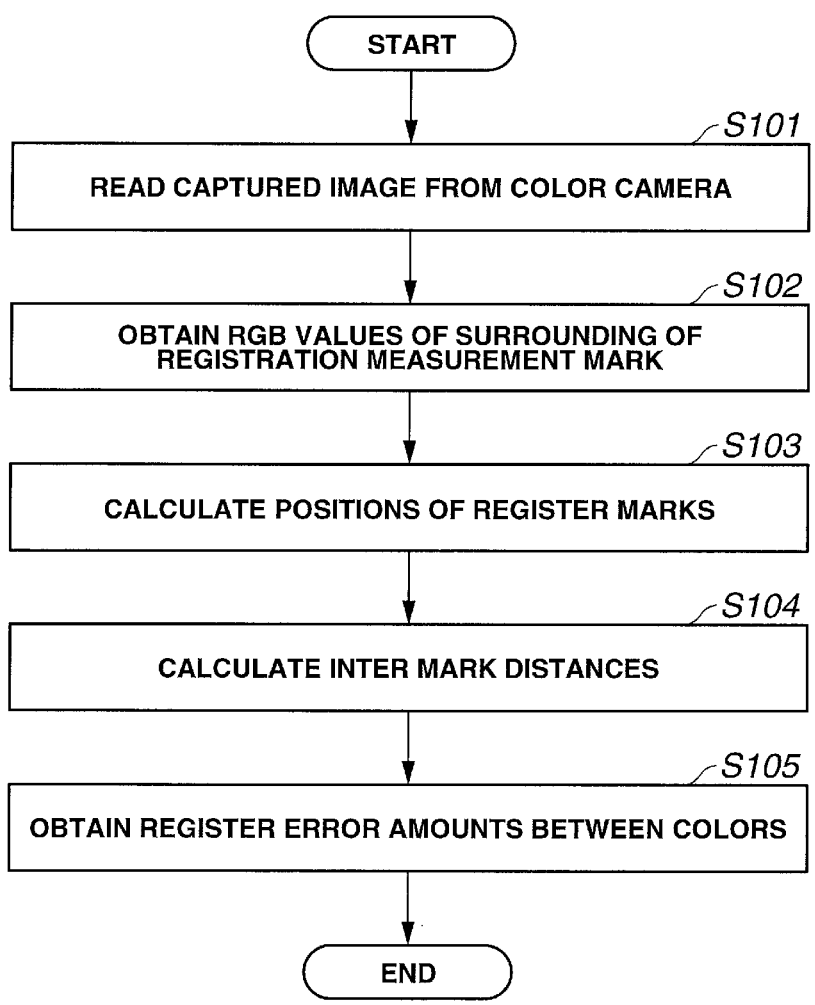
FIG. 6 is a flowchart showing the schematic operation of the register error amount detection apparatus shown in FIG. 5.

The schematic operation of the register error amount detection apparatus 100 will be described with reference to the flowchart shown in FIG. 6. The printing units 1-1 to 1-4 sequentially print the respective colors on a printing sheet. The color camera (the camera of the printing quality inspection apparatus) 10 captures an image of the finished printing product. At this time, the color camera 10 captures an image of a region including the registration measurement mark MP printed in the margin of the printing product as well as the patterns on the printing product.

In the register error amount detection apparatus 100, the captured image reading unit 101 reads the captured image transferred from the color camera 10 (step S101). The captured image from the color camera 10 also includes the registration measurement mark MP printed in the margin of the printing product. The captured image reading unit 101 obtains the RGB values of the surrounding of the registration measurement mark MP from the read captured image (step S102), and sends the obtained RGB values of the surrounding of the registration measurement mark MP to the register error amount detection unit 102.

The register error amount detection unit 102 calculates the positions of the register marks P0 to P7 of the registration measurement mark MP from the RGB values of the surrounding of the registration measurement mark MP, which are sent from the captured image reading unit 101, by using techniques such as template matching and sub-pixel estimation (step S103). As the positions of the register marks P0 to P7, for example, the centers of the register marks P0 to P7 are calculated. Note that template matching and sub-pixel estimation are disclosed in, for example, Motoki Arai et. al., "Optimization of Correlation Function and Sub-Pixel Estimation Method on Block Matching", IPSJ SIG Computer Vison and Image Media (CVIM), 2004 (40(2004-CVIM-144)), May 6, 2004, pp. 33-40 (literature 4).

Figure 7A:
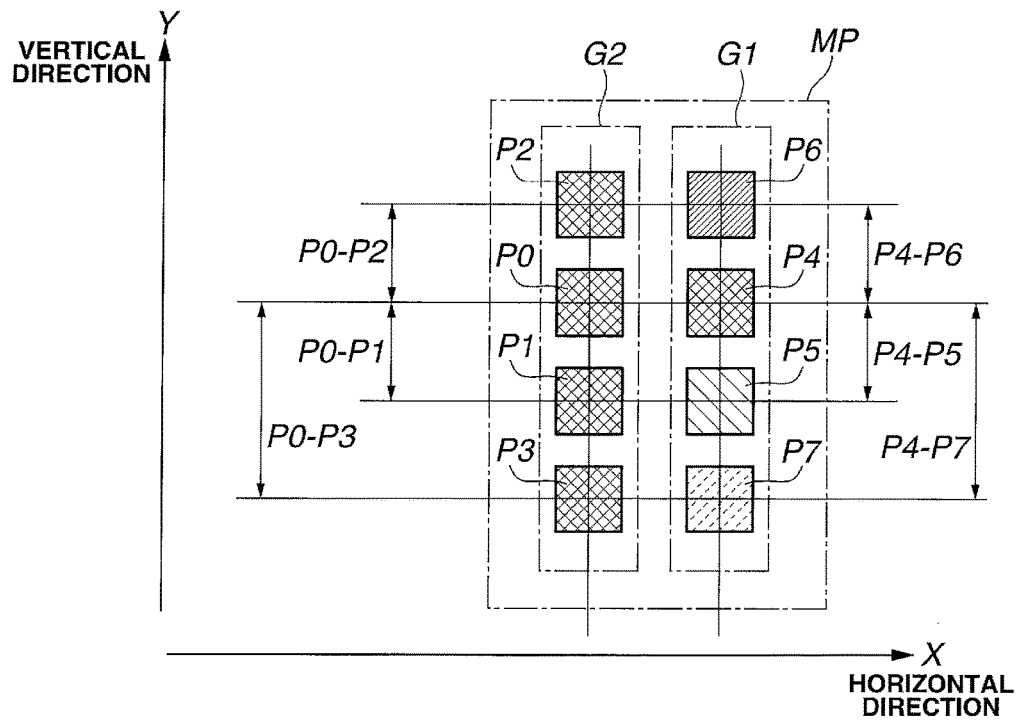
FIG. 7A is a view showing inter reference mark distances and inter measurement target mark distances in the Y direction (vertical direction) obtained from the registration measurement mark shown in FIG. 4.

The register error amount detection unit 102 calculates the distances between the register marks P0 to P7 from the calculated positions of the register marks P0 to P7 of the registration measurement mark MP (step S104). That is, as shown in FIG. 7A, the register error amount detection unit 102 obtains distances P4-P5, P4-P6, and P4-P7 between the register mark P4 of the reference color and the register marks P5, P6, and P7 of the remaining colors in the first register mark group G1 as inter measurement target mark distances in the Y direction (the vertical direction, the array direction, or the first direction). The register error amount detection unit 102 also obtains distances P0-P1, P0-P2, and P0-P3 between the register mark P0 of the reference color and the register marks P1, P2, and P3 of the reference color in the second register mark group G2 as inter reference mark distances of the measurement targets in the Y direction (the vertical direction, the array direction, or the first direction).

Figure 7B:
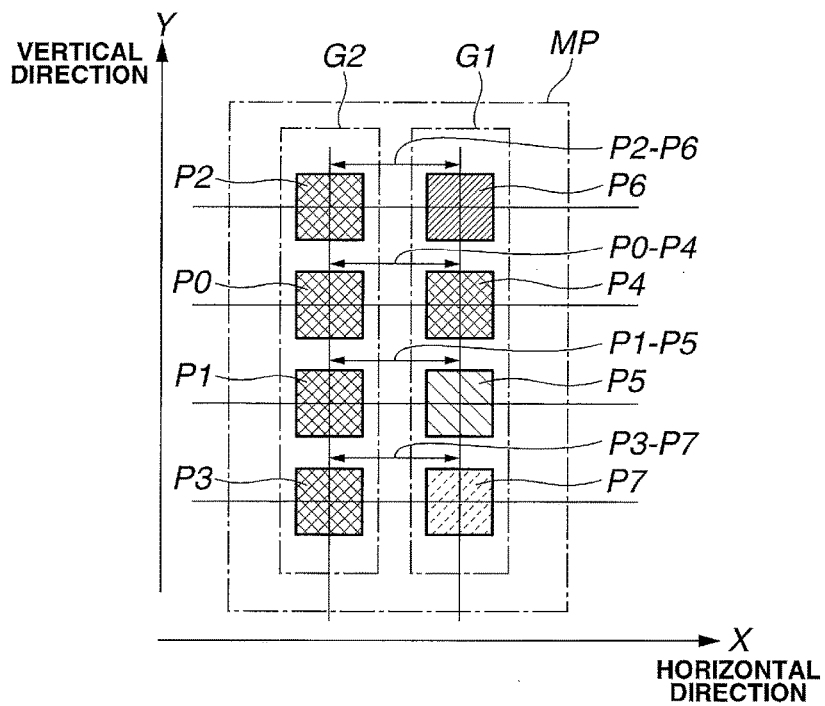
FIG. 7B is a view showing inter reference mark distances and inter measurement target mark distances in the X direction (horizontal direction) obtained from the registration measurement mark shown in FIG. 4.

As shown in FIG. 7B, the register error amount detection unit 102 obtains a distance P0-P4 between the register mark P0 of the reference color in the second register mark group G2 and the register mark P4 of the reference color in the first register mark group G1 as an inter reference mark distance in the X direction (the horizontal direction, a direction perpendicular to the array direction, or the second direction). The register error amount detection unit 102 also obtains distances P1-P5, P2-P6, and P3-P7 between the register marks P1, P2, and P3 of the reference color in the second register mark group G2 and the register marks P5, P6, and P7 of the remaining colors in the first register mark group G1 as inter measurement target mark distances in the X direction (the horizontal direction, a direction perpendicular to the array direction, or the second direction).

The register error amount detection unit 102 obtains the register error amounts (register error amounts between colors) of the remaining colors with reference to "black" in the X and Y directions from the obtained inter measurement target mark distances and inter reference mark distances in the X and Y directions (step S105). In this case, the first register error amount detection unit 102-1 obtains register error amounts $\Delta y1$, $\Delta y2$, and $\Delta y3$ of the respective colors "cyan", "magenta", and "yellow" with reference to "black" in the Y direction, and the second register error amount detection unit 102-2 obtains register error amounts $\Delta x1$, $\Delta x2$, and $\Delta x3$ of the respective colors "cyan", "magenta", and "yellow" with reference to "black" in the X direction.

Figure 8A:
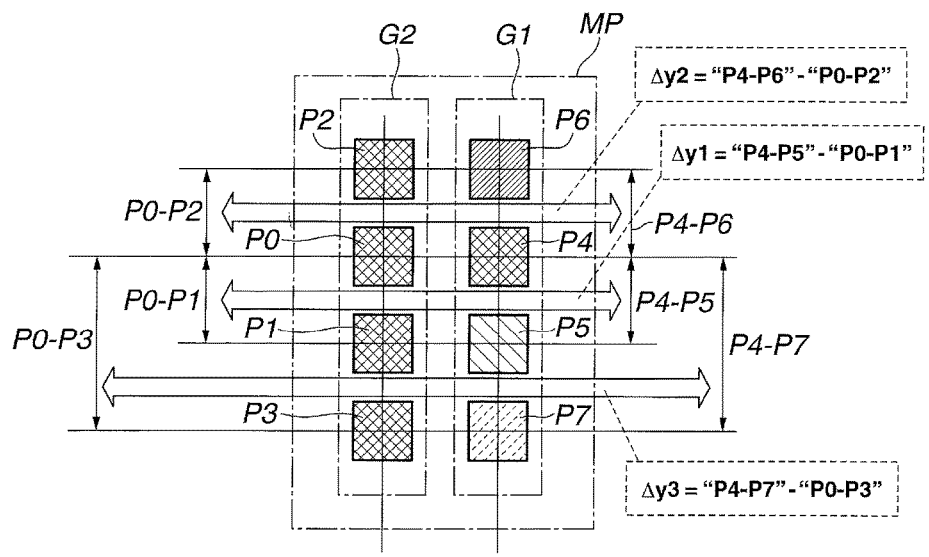
FIG. 8A is a view showing the register error amounts of the colors "cyan", "magenta", and "yellow" in the Y direction (vertical direction) obtained from the registration measurement mark shown in FIG. 4.

More specifically, as shown in FIG. 8A, the first register error amount detection unit 102-1 obtains the register error amount $\Delta y1$ in the Y direction ($\Delta y1$="P4-P5"-"P0-P1") of "cyan" with reference to "black" as the difference between the inter measurement target mark distance P4-P5 and the inter reference mark distance P0-P1, obtains the register error amount $\Delta y2$ in the Y direction ($\Delta y2$="P4-P6"-"P0-P2") of "magenta" with reference to "black" as the difference between the inter measurement target mark distance P4-P6 and the inter reference mark distance P0-P2, and obtains the register error amount $\Delta y3$ in the Y direction ($\Delta y3$="P4-P7"-"P0-P3") of "yellow" with reference to "black" as the difference between the inter measurement target mark distance P4-P7 and the inter reference mark distance P0-P3 (see Table 1).

Figure 8B:
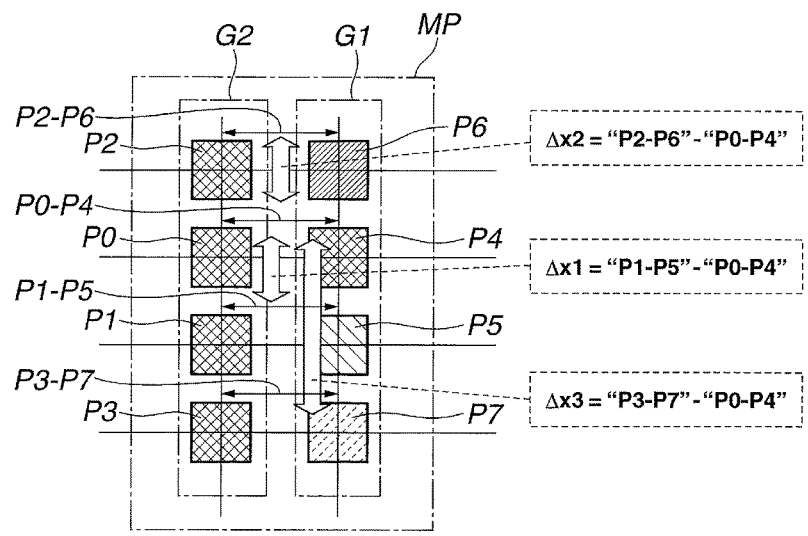
FIG. 8B is a view showing the register error amounts of the colors "cyan", "magenta", and "yellow" in the X direction (horizontal direction) obtained from the registration measurement mark shown in FIG. 4.

As shown in FIG. 8B, the second register error amount detection unit 102-2 obtains the register error amount $\Delta x1$ in the X direction ($\Delta x1$="P1-P5"-"P0-P4") of "cyan" with reference to "black" as the difference between the inter measurement target mark distance P1-P5 and the inter reference mark distance P0-P4, obtains the register error amount $\Delta x2$ in the X direction ($\Delta x2$="P2-P6"-"P0-P4") of "magenta" with reference to "black" as the difference between the inter measurement target mark distance P2-P6 and the inter reference mark distance P0-P4, and obtains the register error amount $\Delta x3$ in the X direction ($\Delta x3$="P3-P7"-"P0-P4") of "yellow" with reference to "black" as the difference between the inter measurement target mark distance P3-P7 and the inter reference mark distance P0-P4 (see Table 1).

Table 1 shows the relationship between inter reference mark distances, inter measurement target mark distances, and register error amounts of the respective colors "cyan", "magenta", and "yellow" in the X direction (horizontal direction) and the Y direction (vertical direction) obtained from the registration measurement mark MP.

TABLE 1

| Direction | Color | Inter reference mark distance | Inter measurement target mark distance | Register error amount |
|---|---|---|---|---|
| X direction (horizontal direction) | Cyan | P0-P4 | P1-P5 | $\Delta x1$ |
|  | Magenta | P0-P4 | P2-P6 | $\Delta x2$ |
|  | Yellow | P0-P4 | P3-P7 | $\Delta x3$ |
| Y direction (vertical direction) | Cyan | P0-P1 | P4-P5 | $\Delta y1$ |
|  | Magenta | P0-P2 | P4-P6 | $\Delta y2$ |
|  | Yellow | P0-P3 | P4-P7 | $\Delta y3$ |

Since the register error amount detection apparatus 100 uses the camera of a printing quality inspection apparatus as the color camera 10, the resolution of the camera is relatively low. For this reason, the chromatic aberration of the lens is large, and the respective sides of all the register marks P0 to P7 constituting the registration measurement mark MP blur in image data obtained by capturing an image of the registration measurement mark MP.

When obtaining the register error amounts $\Delta x1$, $\Delta x2$, and $\Delta x3$ of respective colors "cyan", "magenta", and "yellow" in the X direction, the inter reference mark distance P0-P4 is obtained while the respective sides of the register marks P0 to P7 blur, as in the case with the inter measurement target mark distances P1-P5, P2-P6, and P3-P7. When obtaining the register error amounts $\Delta y1$, $\Delta y2$, and $\Delta y3$ of the respective colors "cyan", "magenta", and "yellow" in the Y direction, the inter reference mark distances P0-P1, P0-P2, and P0-P3 are obtained while the respective sides of the register marks P0 to P7 blur, as in the case with the inter measurement target mark distances P4-P5, P4-P6, and P4-P7. However, errors similar to those in inter measurement target mark distances also occur in inter reference mark distances. Therefore, comparing the measurement target inter-make distances with the inter reference mark distances will cancel the respective errors each other, resulting in reductions in error amounts. This makes it possible to accurately detect the register error amounts between the respective colors in both the X direction and the Y direction.

Assume that in the first embodiment, when obtaining the register error amounts between the respective colors in the X and Y directions, the register error amounts of the remaining colors with respect to the reference color are obtained by using image data (RGB image data) complementary to the respective colors. That is, when obtaining an error amount at the position of a register mark of "cyan" with respect to a register mark of "black", the shift amount of the register mark of "cyan" with respect to the register mark of "black" of R image data is obtained. When obtaining an error amount at the position of a register mark of "magenta" with respect to a register mark of "black", the shift amount of the register mark of "magenta" with respect to the register mark of "black" of G image data is obtained. When obtaining an error amount at the position of a register mark of "yellow" with respect to a register mark of "black", the shift amount of the register mark of "yellow" with respect to the register mark of "black" of B image data is obtained.

Figure 9A:
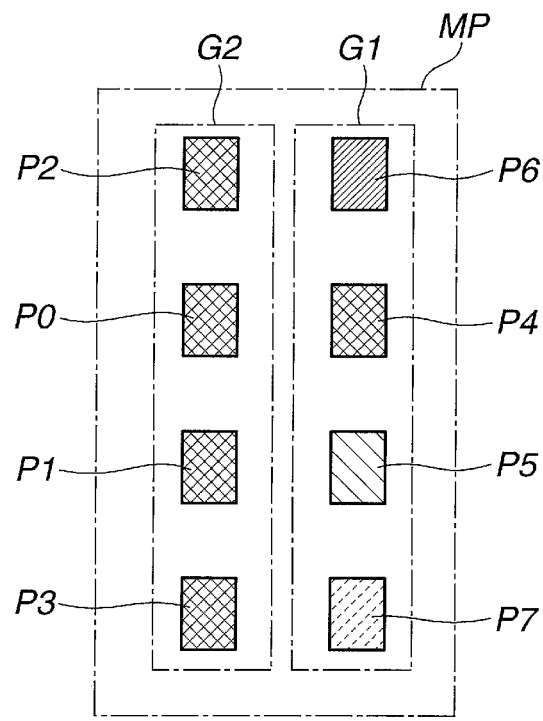
FIGS. 9A to 9D are views each showing an example of the shape of register marks constituting a registration measurement mark.
Figure 9B:
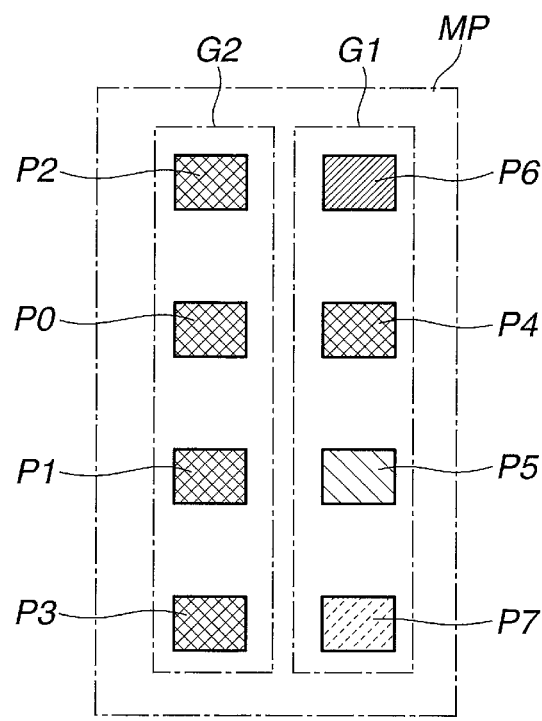
Figure 9C:
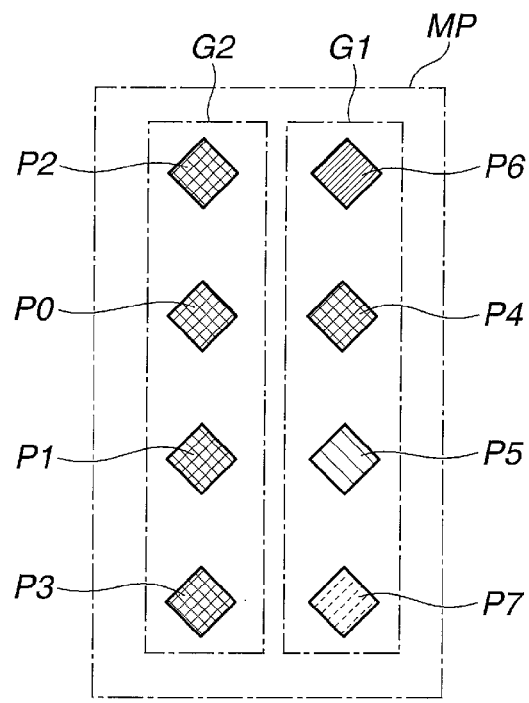
Figure 9D:
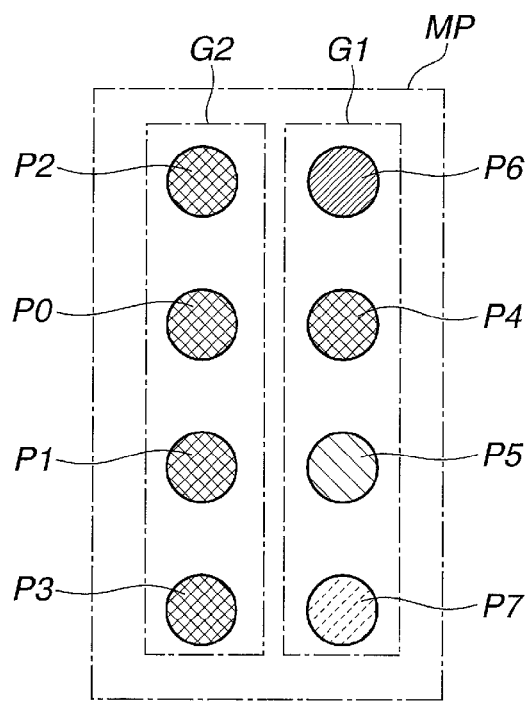

In addition, in the first embodiment, the register marks P0 to P7 constituting the registration measurement mark MP each have a square shape. However, each register mark may have a rectangular shape as shown in FIGS. 9A and 9B, a rhombic shape as shown in FIG. 9C, or a circular shape as shown in FIG. 9D. Note that referring to FIG. 9A, the register marks P0 to P7 each have a rectangular shape longer in the vertical direction (Y direction). Referring to FIG. 9B, the register marks P0 to P7 each have a rectangular shape longer in the horizontal direction (X direction).

Figure 10A:
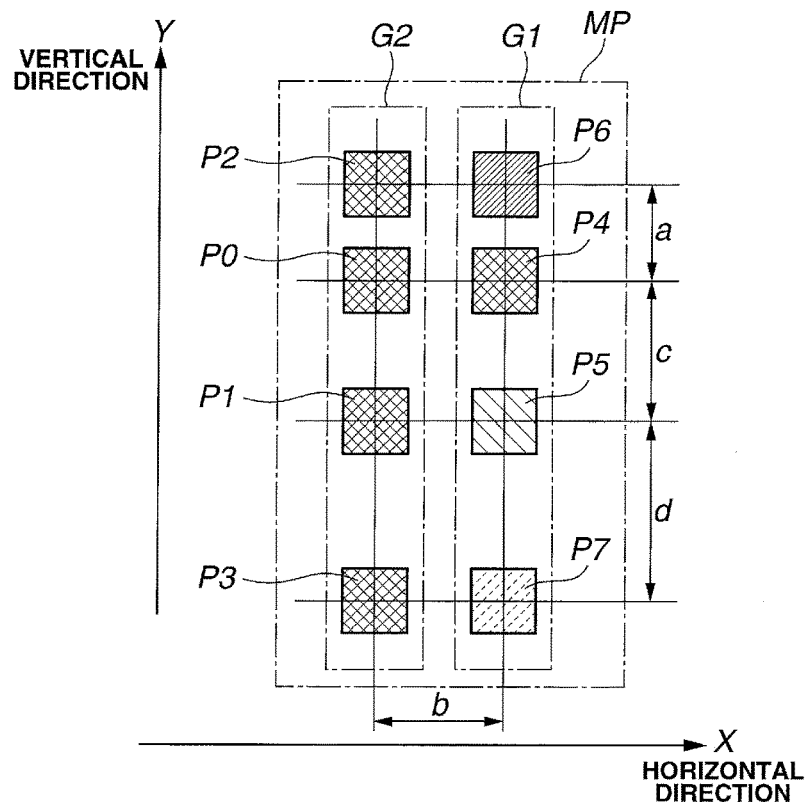
FIG. 10A is a view showing a registration measurement mark with the intervals between the register marks differing from each other in the array direction (Y direction)

In addition, in the first embodiment, the intervals of the register marks P4 to P7 in the first register mark group G1 and those of the register marks P0 to P3 in the second register mark group G2 in the first direction (Y direction) are set to the predetermined value a. However, as shown in FIG. 10A, different intervals may be set in the first direction (Y direction). For example, the interval between register marks P4 (P0) and P5 (P1) is set to c (c>a), and the interval between the register marks P5 (P1) and P7 (P3) is set to d (d>c).

Figure 10B:
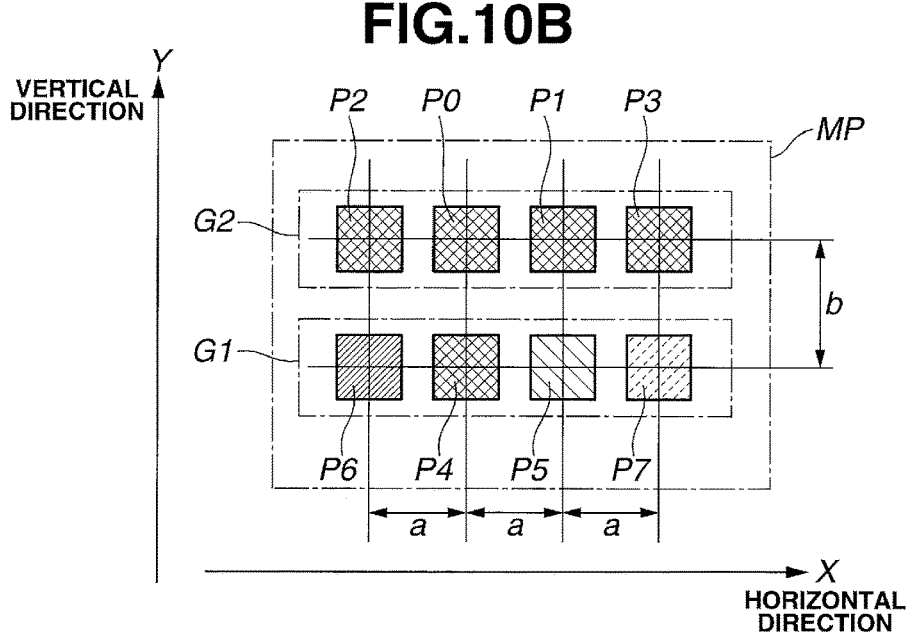
FIG. 10B is a view showing a registration measurement mark with the X direction (horizontal direction) being the array direction of register marks.

Furthermore, in the first embodiment, the array direction (the array direction of the register marks P0 to P3 and P4 to P7) of the first register mark group G1 and the second register mark group G2 of the registration measurement mark MP is set to the vertical direction (Y direction). However, as shown in FIG. 10B, the array direction may be set to the horizontal direction (X direction). In this case, the horizontal direction (X direction) of a printing product is the first direction described above, and the vertical direction (Y direction) of the printing product is the second direction described above.

The array direction of the register marks P0 to P3 and P4 to P7 printed on a printing product corresponds to the array direction of the register marks P0 to P3 and P4 to P7 printed on the printing plate 16a. If, therefore, the array direction of the former is the horizontal direction (X direction) of the printing product, the array direction of the latter is the horizontal direction (X direction) of the printing plate 16a. In this case, the horizontal direction (X direction) of the printing plate 16a is the third direction described above, and the vertical direction (Y direction) of the printing plate 16a is the fourth direction.

In the first embodiment, the array sequence of the register marks P4 to P7 of the respective colors in the second register mark group G2 is not limited to the one in this example. These points equally apply to the second and third embodiments (to be described later).

In the first embodiment (basic example), one registration measurement mark MP is used to obtain register error amounts. In practice, however, the register error amounts between colors are obtained by using a plurality of registration measurement marks MP. In addition, the register error amounts between the colors are obtained not only in the vertical and horizontal directions but also in the twisting direction. Furthermore, the rotational phase and horizontal position of the plate cylinder 16 in the printing unit 1 for each color and the like are adjusted. The first and second specific examples of the first embodiment will be respectively described as the second and third embodiments.

[Second Embodiment]

Figure 11:
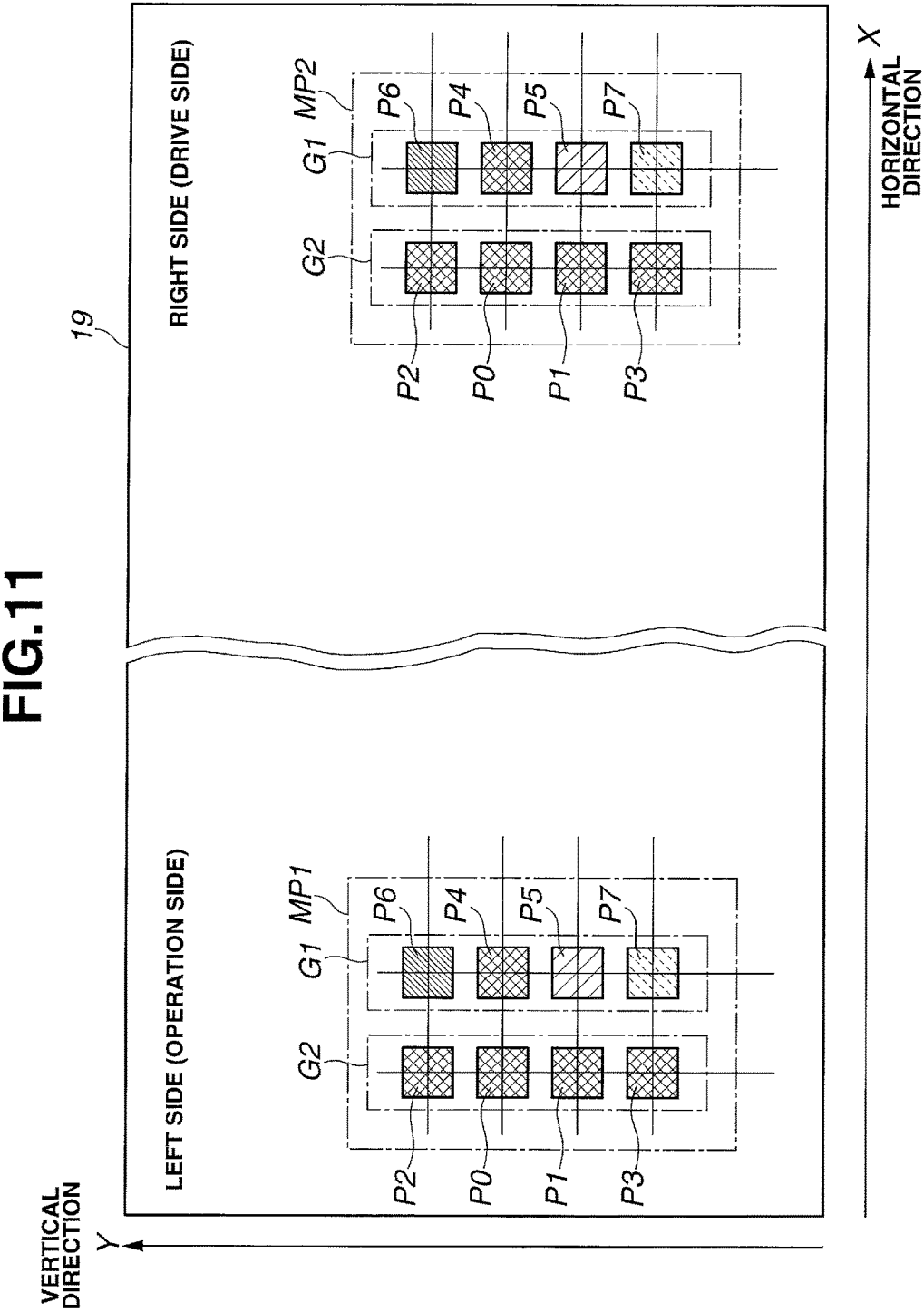
FIG. 11 is a view showing a plurality of registration measurement marks used in the second embodiment (first specific example) of the present invention.

The second embodiment of the present invention is an inline automatic plate registration control apparatus which obtains the register error amounts between colors by using a plurality of registration measurement marks MP and adjusts the rotational phase and horizontal position of a plate cylinder 16 in a printing unit 1 for each color and the like based on the obtained register error amounts between the colors. Note that the second embodiment uses the two registration measurement marks MP. As shown in FIG. 11, a first registration measurement mark MP1 is printed in a margin of a printing product 19 on the left side (operation side), and a second registration measurement mark MP2 is printed in a margin on the right side (drive side). Since the arrangement of the registration measurement marks MP1 and MP2 is the same as that of the registration measurement mark MP shown in FIG. 4, a description of it will be omitted.

Figure 12:
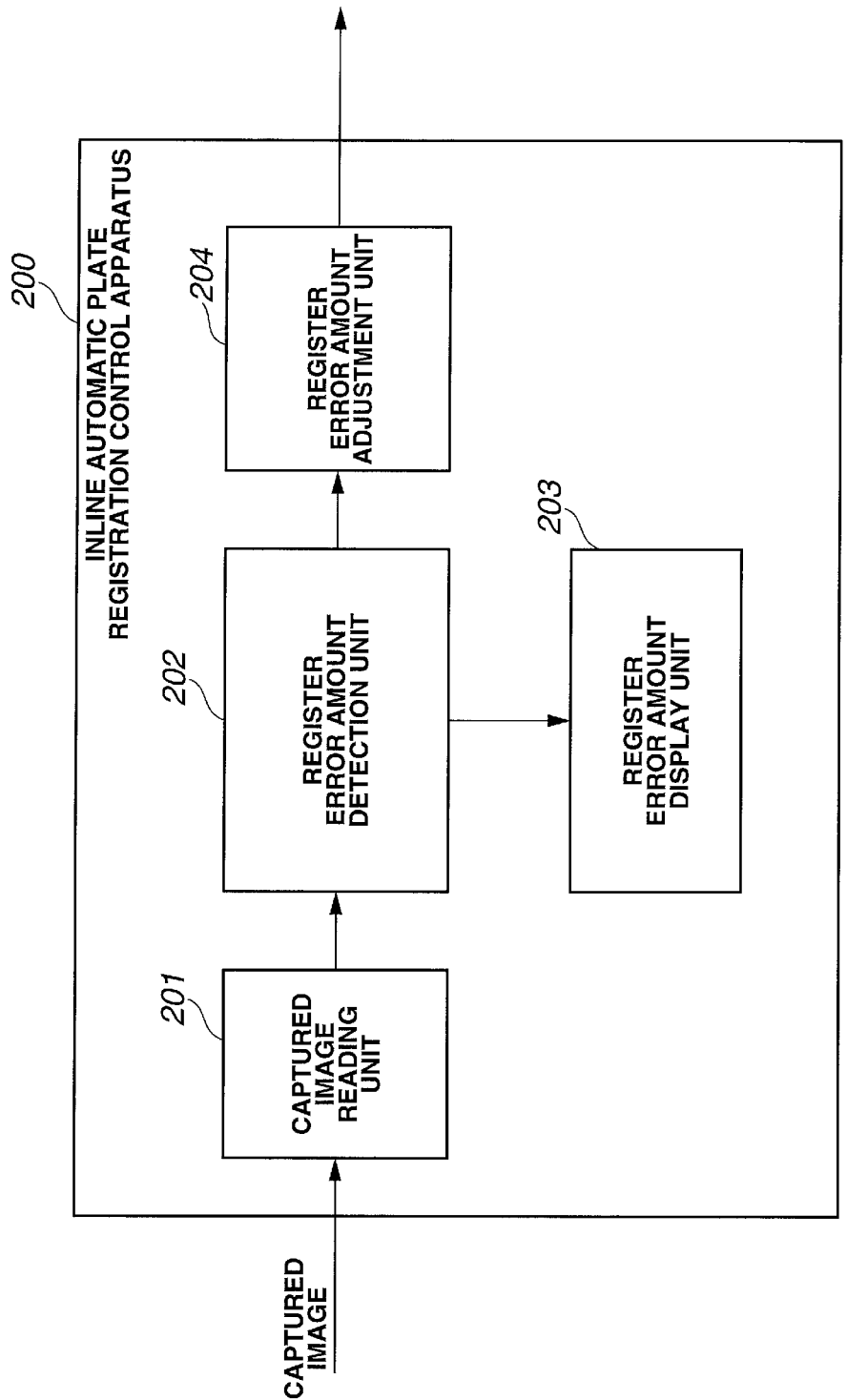
FIG. 12 is a functional block diagram of the main part of an inline automatic plate registration control apparatus according to the second embodiment of the present invention.

As shown in FIG. 12, an inline automatic plate registration control apparatus 200 includes a captured image reading unit 201 which reads a captured image transferred from a color camera (the camera of a printing quality inspection apparatus) 10 shown in FIG. 1, a register error amount detection unit 202 which obtains the register error amounts (the register error amounts in the vertical direction/horizontal direction/twisting direction) between the colors of patterns printed on the printing product 19 based on register marks P0 to P7 constituting the registration measurement marks MP1 and MP2 in the captured image read by the captured image reading unit 201, a register error amount display unit 203 which displays the register error amounts between the colors obtained by the register error amount detection unit 202, and a register error amount adjustment unit 204 which adjusts the rotational phase and horizontal position of the plate cylinder 16 of the printing unit 1 for each color and the position of a transfer cylinder (not shown) in the twisting direction which conveys a printing sheet based on the register error amounts between the colors obtained by the register error amount detection unit 202.

Figure 13:
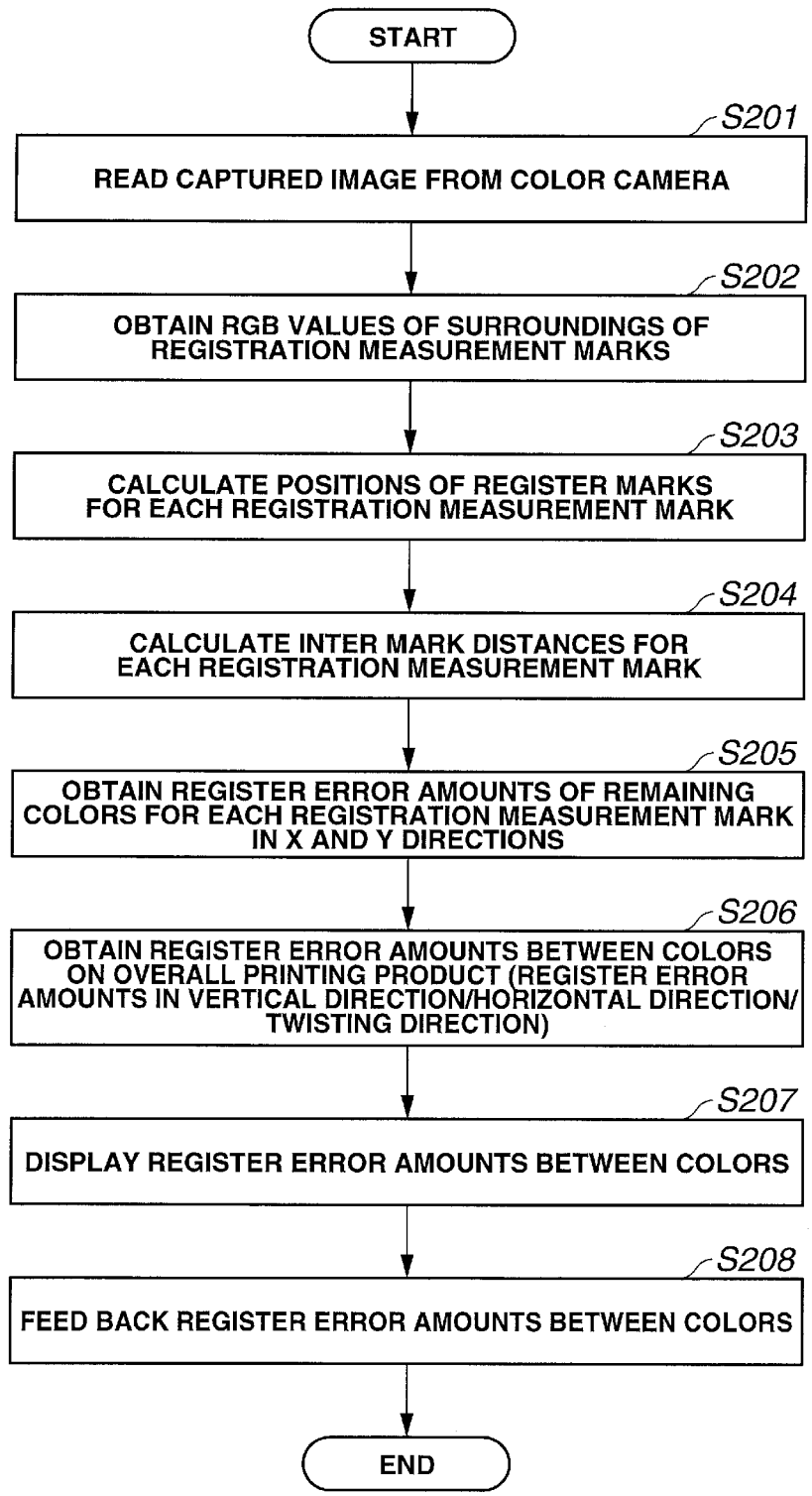
FIG. 13 is a flowchart showing the schematic operation of the inline automatic plate registration control apparatus shown in FIG. 12.

The schematic operation of the inline automatic plate registration control apparatus 200 will be described with reference to the flowchart shown in FIG. 13. Printing units 1-1 to 1-4 sequentially print the respective colors on a printing sheet. The color camera (the camera of the printing quality inspection apparatus) 10 captures an image of the finished printing product. At this time, the color camera 10 captures an image of regions including the registration measurement marks MP1 and MP2 printed in the margins of the printing product as well as the patterns on the printing product.

In the inline automatic plate registration control apparatus 200, the captured image reading unit 201 reads the captured image transferred from the color camera 10 (step S201). The captured image from the color camera 10 also includes the registration measurement marks MP1 and MP2 printed in the margins of the printing product 19. The captured image reading unit 201 obtains the RGB values of the surroundings of the registration measurement marks MP1 and MP2 from the read captured image (step S202), and sends the obtained RGB values of the surroundings of the registration measurement marks MP1 and MP2 to the register error amount detection unit 202.

The register error amount detection unit 202 calculates the positions of the register marks P0 to P7 of the respective registration measurement marks MP1 and MP2 from the RGB values of the surroundings of the registration measurement marks MP1 and MP2, which are sent from the captured image reading unit 201, by using techniques such as template matching and sub-pixel estimation described above (step S203). The register error amount detection unit 202 calculates the distances between the combinations of the marks shown in Table 1 (inter reference mark distances/inter measurement target mark distances) for each of the registration measurement marks MP1 and MP2 from the calculated positions of the register marks P0 to P7 of each of the registration measurement marks MP1 and MP2 in the same manner as in the first embodiment (step S204).

The register error amount detection unit 202 obtains register error amounts $\Delta x1$, $\Delta x2$, and $\Delta x3$ of the respective colors "cyan", "magenta", and "yellow" with reference to "black" in the X direction and register error amounts $\Delta y1$, $\Delta y2$, and $\Delta y3$ in the Y direction, with respect to each of the registration measurement marks MP1 and MP2, from the obtained distances between the marks (inter reference mark distances/inter measurement target mark distances) in the same manner as in the first embodiment (step S205).

The register error amount detection unit 202 calculates the register error amounts between the respective colors (the register error amounts in the vertical direction/horizontal direction/twisting direction) on the overall printing product 19 from the register error amounts ($\Delta x1$ to $\Delta x3$ and $\Delta y1$ to $\Delta y3$) of the respective colors "cyan", "magenta", and "yellow" in the X and Y directions obtained from the registration measurement mark MP1 and the register error amounts ($\Delta x1$ to $\Delta x3$ and $\Delta y1$ to $\Delta y3$) of the respective colors "cyan", "magenta", and "yellow" in the X and Y directions obtained from the registration measurement mark MP2 (step S206). The register error amount detection unit 202 then sends the calculated register error amounts between the colors (the register error amounts in the vertical direction/horizontal direction/twisting direction) to the register error amount display unit 203 and the register error amount adjustment unit 204.

The register error amount display unit 203 displays the register error amounts between the colors (the register error amounts in the vertical direction/horizontal direction/twisting direction) sent from the register error amount detection unit 202 (step S207). The register error amount adjustment unit 204 adjusts the rotational phase and horizontal position of the plate cylinder 16 of the printing unit 1 for each color and the position of the transfer cylinder in the twisting direction, which transfers a printing sheet, based on the register error amounts between the colors (the register error amounts in the vertical direction/horizontal direction/twisting direction) sent from the register error amount detection unit 202 (step S208).

[Third Embodiment]

The third embodiment of the present invention is a printing quality inspection/register error amount detection apparatus as a combination of a printing quality inspection apparatus and a register error amount detection apparatus. Assume that as in the second embodiment, in the third embodiment, as shown in FIG. 11, a first registration measurement mark MP1 is printed in a margin of a printing product 19 on the left side (operation side), and a second registration measurement mark MP2 is printed in a margin on the right side (drive side).

Figure 14:
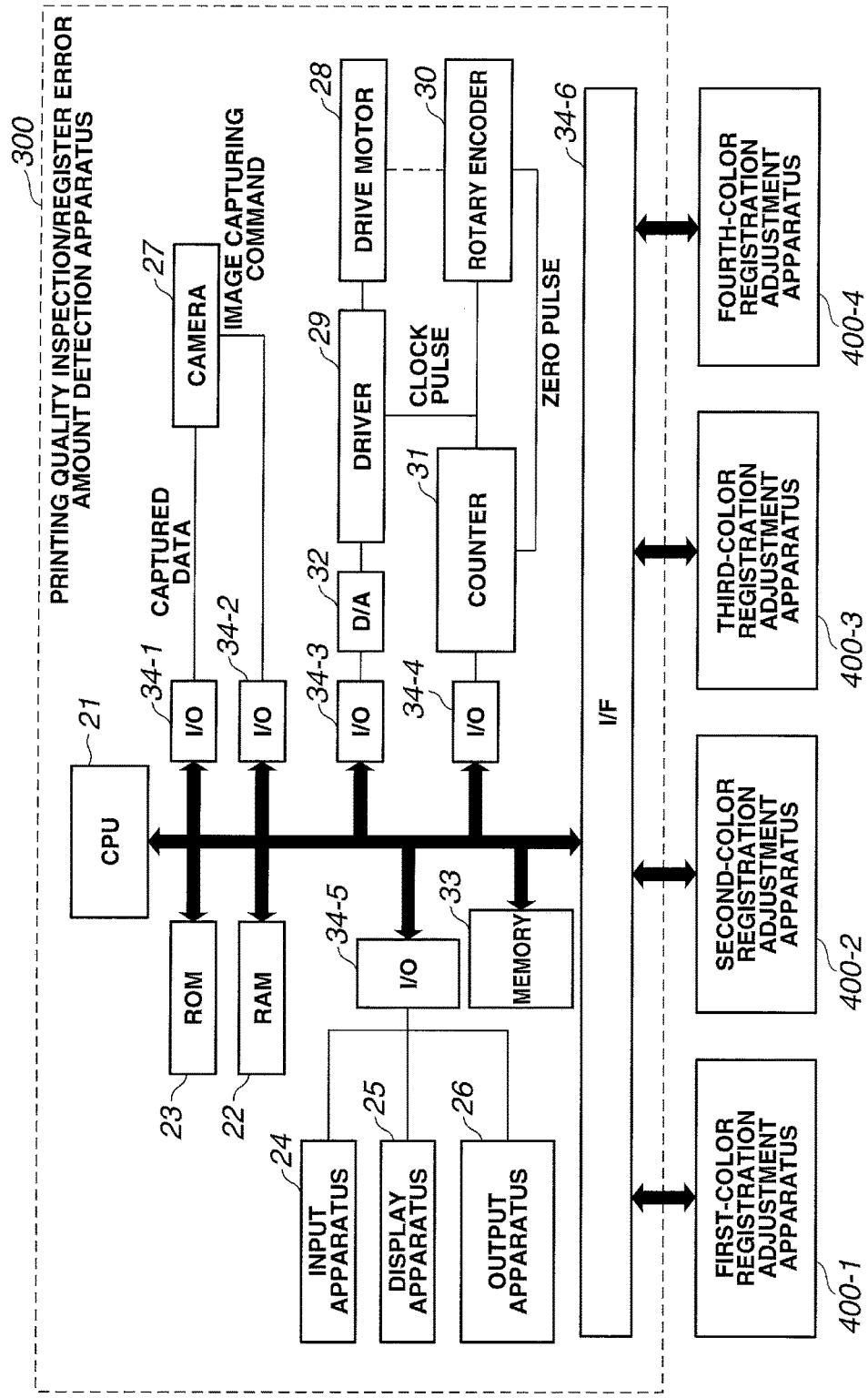
FIG. 14 is a block diagram showing a printing quality inspection/register error amount detection apparatus according to the third embodiment (second specific example) of the present invention.

As shown in FIG. 14, a printing quality inspection/register error amount detection apparatus 300 includes a CPU 21, a RAM 22, a ROM 23, an input apparatus 24, a display apparatus 25, an output apparatus 26, a camera (color camera) 27, a drive motor 28, a drive motor driver 29, a drive motor rotary encoder 30, a printing press rotational phase detection counter 31, a D/A converter 32, a memory 33, and input/output interfaces (I/O I/Fs) 34-1 to 34-6. A first-color registration adjustment apparatus 400-1, a second-color registration adjustment apparatus 400-2, a third-color registration adjustment apparatus 400-3, and a fourth-color registration adjustment apparatus 400-4 are connected to the interface 34-6. The output apparatus 26 includes a flexible disk drive and a printer. Note that the camera 27 corresponds to the color camera (the camera of the printing quality inspection apparatus) 10 shown in FIG. 1.

The CPU 21 obtains various types of input information supplied via the input/output interfaces 34-1 to 34-6, and operates in accordance with a program stored in the ROM 23 while accessing the RAM 22 and the memory 33. The ROM 23 stores a printing quality inspection program and a register error amount detection program for obtaining the register error amounts between colors.

Figure 15A:
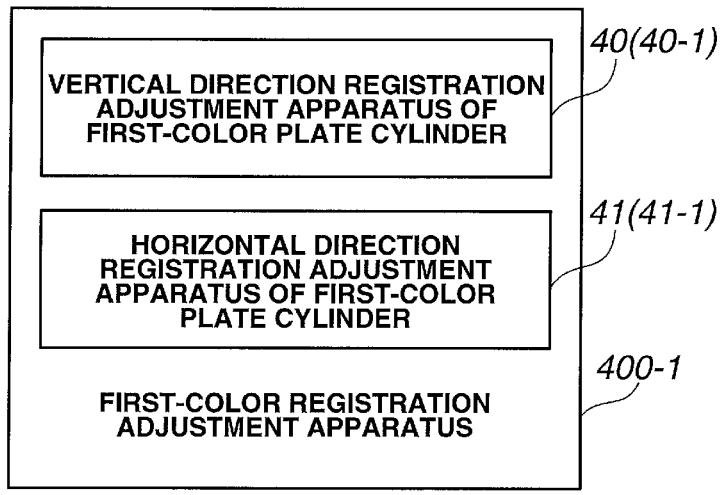
FIG. 15A is a block diagram showing a first-color registration adjustment apparatus in the printing quality inspection/register error amount detection apparatus shown in FIG. 14.
Figure 15B:
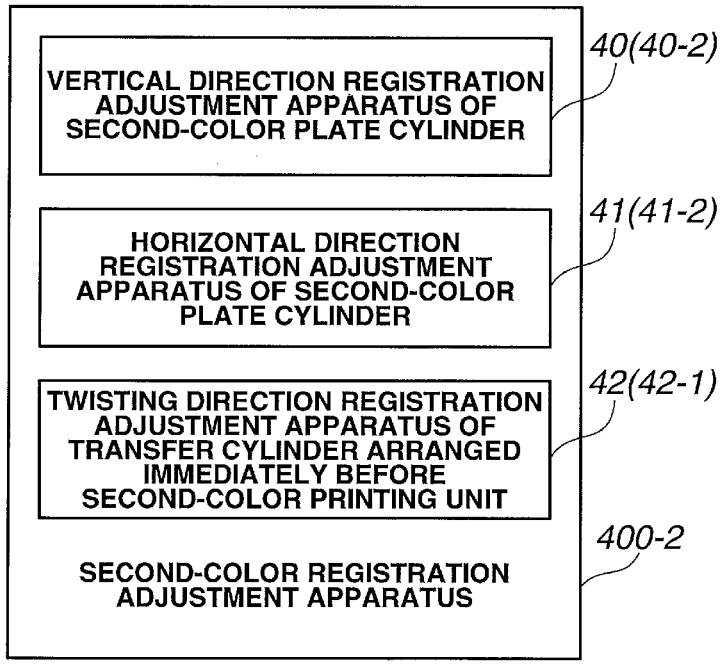
FIG. 15B is a block diagram showing a second-color registration adjustment apparatus in the printing quality inspection/register error amount detection apparatus shown in FIG. 14.
Figure 15C:
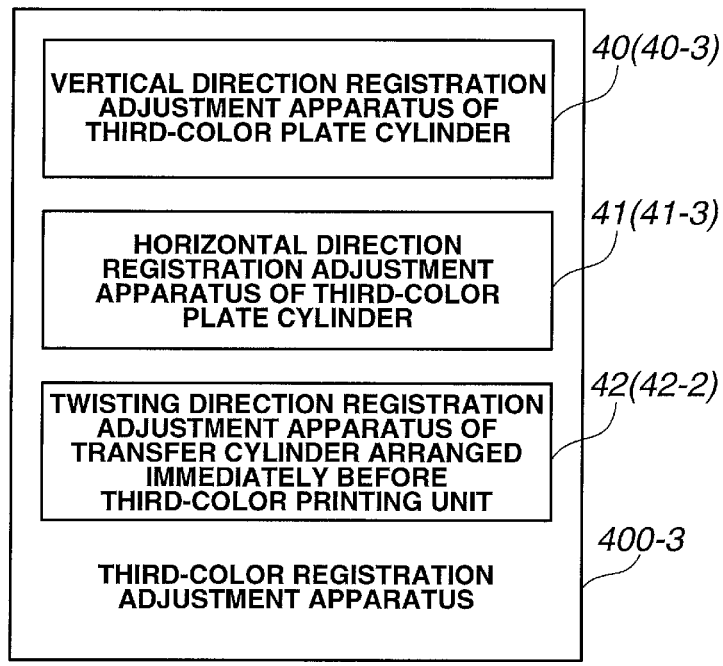
FIG. 15C is a block diagram showing a third-color registration adjustment apparatus in the printing quality inspection/register error amount detection apparatus shown in FIG. 14.
Figure 15D:
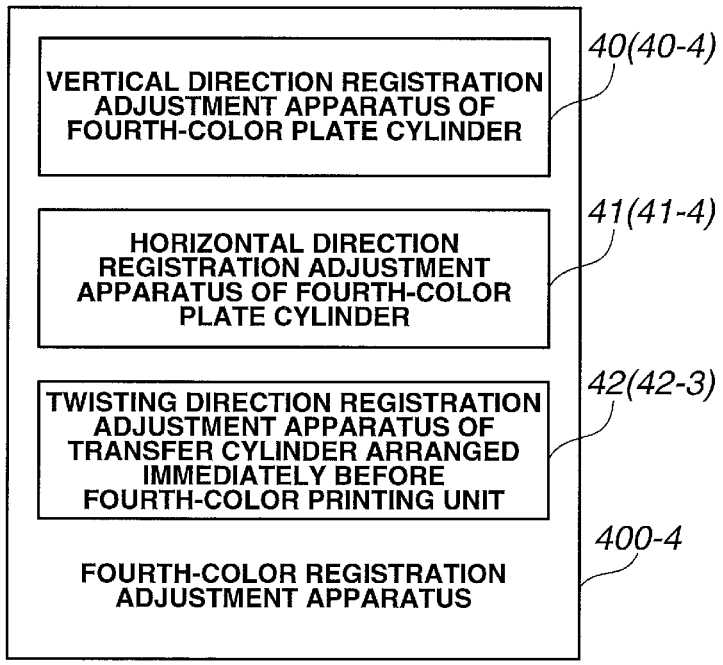
FIG. 15D is a block diagram showing a fourth-color registration adjustment apparatus in the printing quality inspection/register error amount detection apparatus shown in FIG. 14.

As shown in FIG. 15A, the first-color registration adjustment apparatus 400-1 includes a vertical direction registration adjustment apparatus 40-1 of the first-color (black) plate cylinder 16 and a horizontal direction registration adjustment apparatus 41-1 of the first-color (black) plate cylinder 16. As shown in FIG. 15B, the second-color registration adjustment apparatus 400-2 includes a vertical direction registration adjustment apparatus 40-2 of a second-color (cyan) plate cylinder 16, a horizontal direction registration adjustment apparatus 41-2 of the second-color (cyan) plate cylinder 16, and a twisting direction registration adjustment apparatus 42-1 of a transfer cylinder arranged immediately before the second-color (cyan) printing unit 1-2. As shown in FIG. 15C, the third-color registration adjustment apparatus 400-3 includes a vertical direction registration adjustment apparatus 40-3 of the third-color (magenta) plate cylinder 16, a horizontal direction registration adjustment apparatus 41-3 of the third-color (magenta) plate cylinder 16, and a twisting direction registration adjustment apparatus 42-2 of a transfer cylinder arranged immediately before the third-color (magenta) printing unit 1-3. As shown in FIG. 15D, the fourth-color registration adjustment apparatus 400-4 includes a vertical direction registration adjustment apparatus 40-4 of the fourth-color (yellow) plate cylinder 16, a horizontal direction registration adjustment apparatus 41-4 of the fourth-color (yellow) plate cylinder 16, and a twisting direction registration adjustment apparatus 42-3 of a transfer cylinder arranged immediately before the fourth-color (yellow) printing unit 1-4.

Figure 16A:
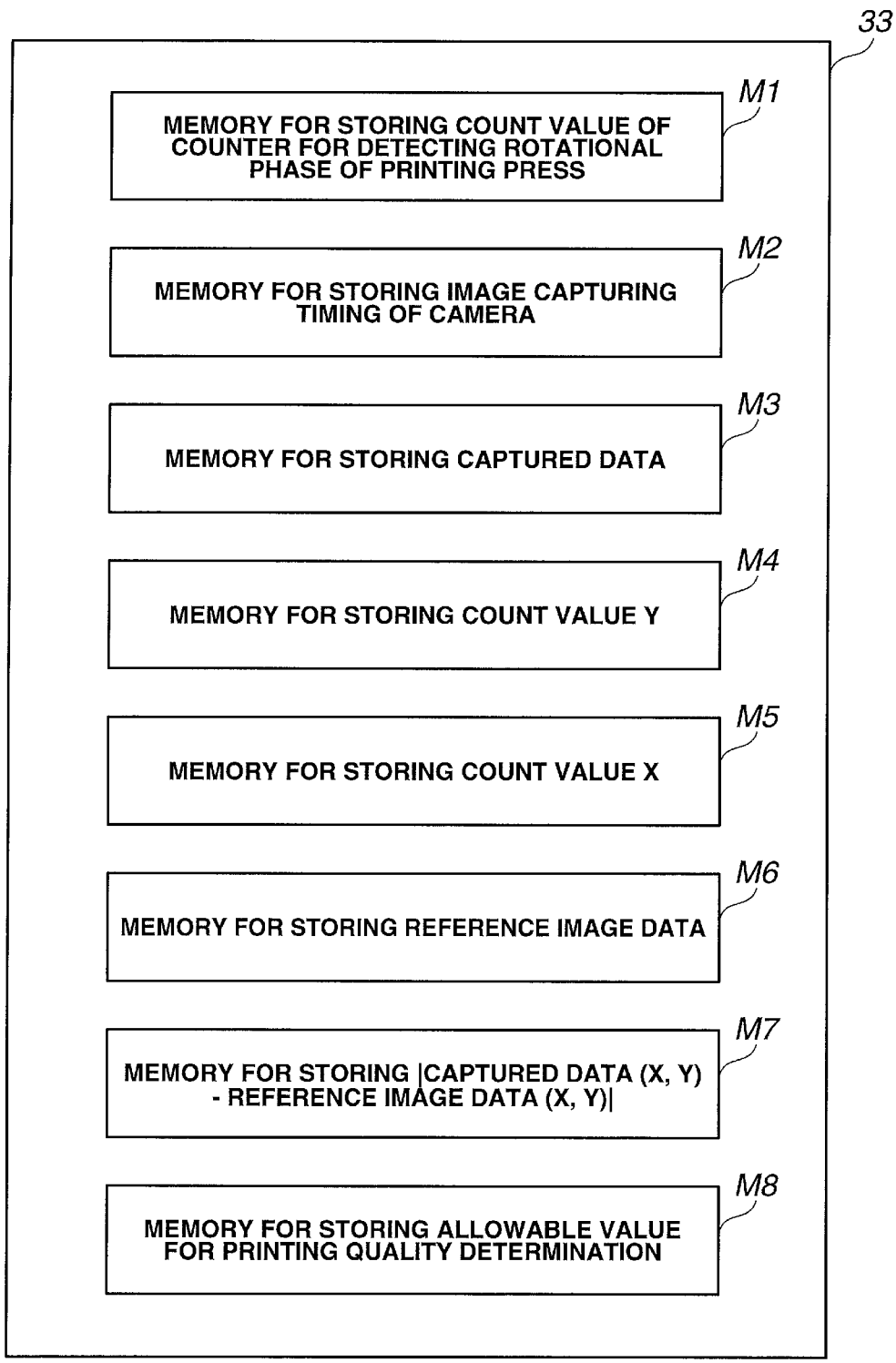
FIGS. 16A to 16C are block diagrams showing the internal arrangement of a memory in the printing quality inspection/register error amount detection apparatus shown in FIG. 14 in a segmented state.
Figure 16B:
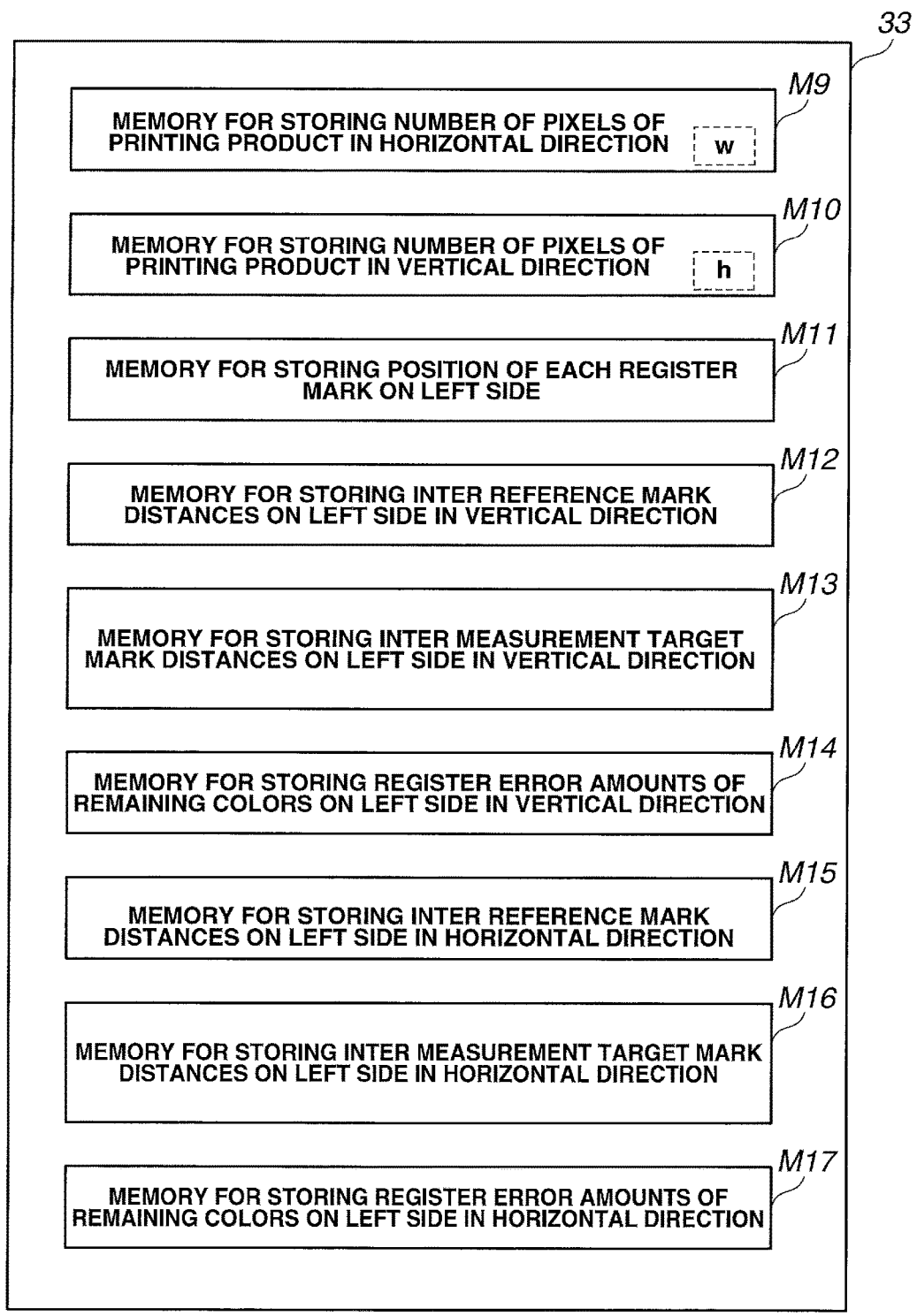
Figure 16C:
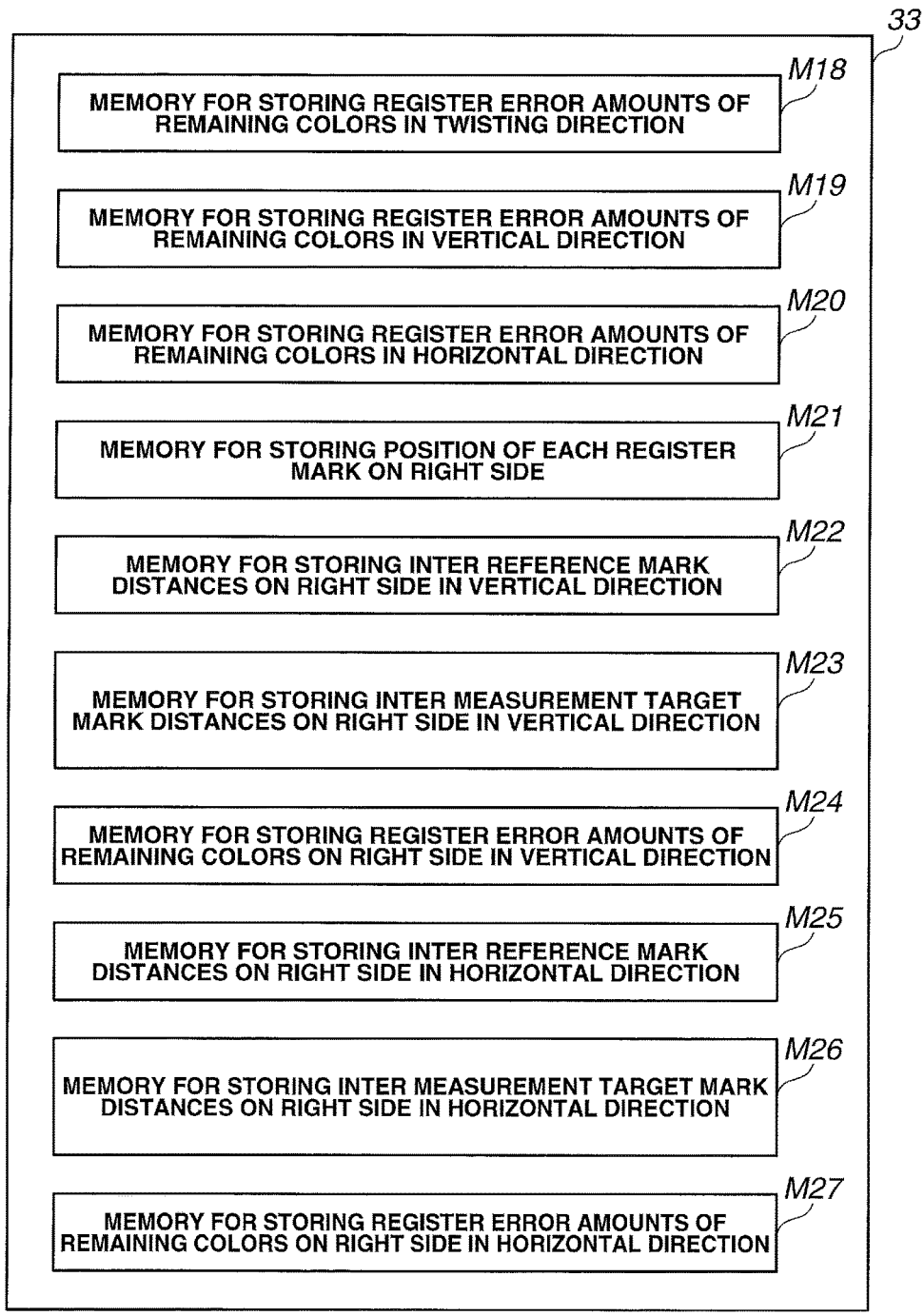

As shown in FIGS. 16A to 16C, the memory 33 includes a memory M1 for storing the count value of a counter for detecting the rotational phase of the printing press, a memory M2 for storing the image capturing timing of the camera, a memory M3 for storing captured data, a memory M4 for storing a count value Y, a memory M5 for storing a count value X, a memory M6 for storing reference image data, a memory M7 for storing |captured data (X, Y)–reference image data (X, Y)|, a memory M8 for storing an allowable value for printing quality determination, a memory M9 for storing the number of pixels of a printing product in the horizontal direction, a memory M10 for storing the number of pixels of the printing product in the vertical direction, a memory M11 for storing the position of each register mark on the left side, a memory M12 for storing inter reference mark distances on the left side in the vertical direction, a memory M13 for storing inter measurement target mark distances on the left side in the vertical direction, a memory M14 for storing register error amounts of the remaining colors on the left side in the vertical direction, a memory M15 for storing inter reference mark distances on the left side in the horizontal direction, a memory M16 for storing inter measurement target mark distances on the left side in the horizontal direction, a memory M17 for storing register error amounts of the remaining colors on the left side in the horizontal direction, a memory M18 for storing register error amounts of the remaining colors in the twisting direction, a memory M19 for storing register error amounts of the remaining colors in the vertical direction, a memory M20 for storing register error amounts of the remaining colors in the horizontal direction, a memory M21 for storing the position of each register mark on the right side, a memory M22 for storing inter reference mark distances on the right side in the vertical direction, a memory M23 for storing inter measurement target mark distances on the right side in the vertical direction, a memory M24 for storing register error amounts of the remaining colors on the right side in the vertical direction, a memory M25 for storing inter reference mark distances on the right side in the horizontal direction, a memory M26 for storing inter measurement target mark distances on the right side in the horizontal direction, and a memory M27 for storing register error amounts of the remaining colors on the right side in the horizontal direction.

Processing operations executed by the CPU 21 of the printing quality inspection/register error amount detection apparatus 300 will be described with reference to the flowcharts shown in FIGS. 17A to 17F. The CPU 21 performs a processing operation according to the printing quality inspection program, and then performs a processing operation according to the register error amount detection program in accordance with these flowcharts. In the following processing operations, for example, the CPU 21 writes various types of data obtained by arithmetic operations in the memories M1 to M27 and reads various types of data from the memories M1 to M27, as needed. To avoid a complicated description, a description of read/write operations with respect to the memories M1 to M27 is sometimes omitted.

[Processing Operation According to Printing Quality Inspection Program]

First of all, the CPU 21 starts printing by outputting a drive instruction to the drive motor driver 29 via the D/A converter 32. The CPU 21 then starts a processing operation according to the printing quality inspection program by reading a count value from the printing press rotational phase detection counter 31 and storing the read count value in the memory M1 as the current count value of the printing press rotational phase detection counter 31 of the printing press (step S301). The CPU 21 reads the image capturing timing of the camera set in the memory M2 (step S302). The CPU 21 then compares the current count value of the printing press rotational phase detection counter 31 with the set imaging capturing timing of the camera (step S303).

The CPU 21 repeats the processing operation in steps S301 to S303. If the current count value of the printing press rotational phase detection counter 31 matches the set image capturing timing of the camera (YES in step S303), the CPU 21 outputs an image capturing command to the camera 27 (step S304). This causes the camera 27 to capture an image of a region including an overall pattern region on the printing product 19 on which patterns of four colors are printed.

After the camera 27 captures an image of the printing product 19, the CPU 21 reads the captured image transferred from the camera 27 and causes the memory M3 to store the read captured image (step S305). The captured image from the camera 27 includes the registration measurement marks MP1 and MP2 printed in the margins of the printing product 19.

Figure 17B:
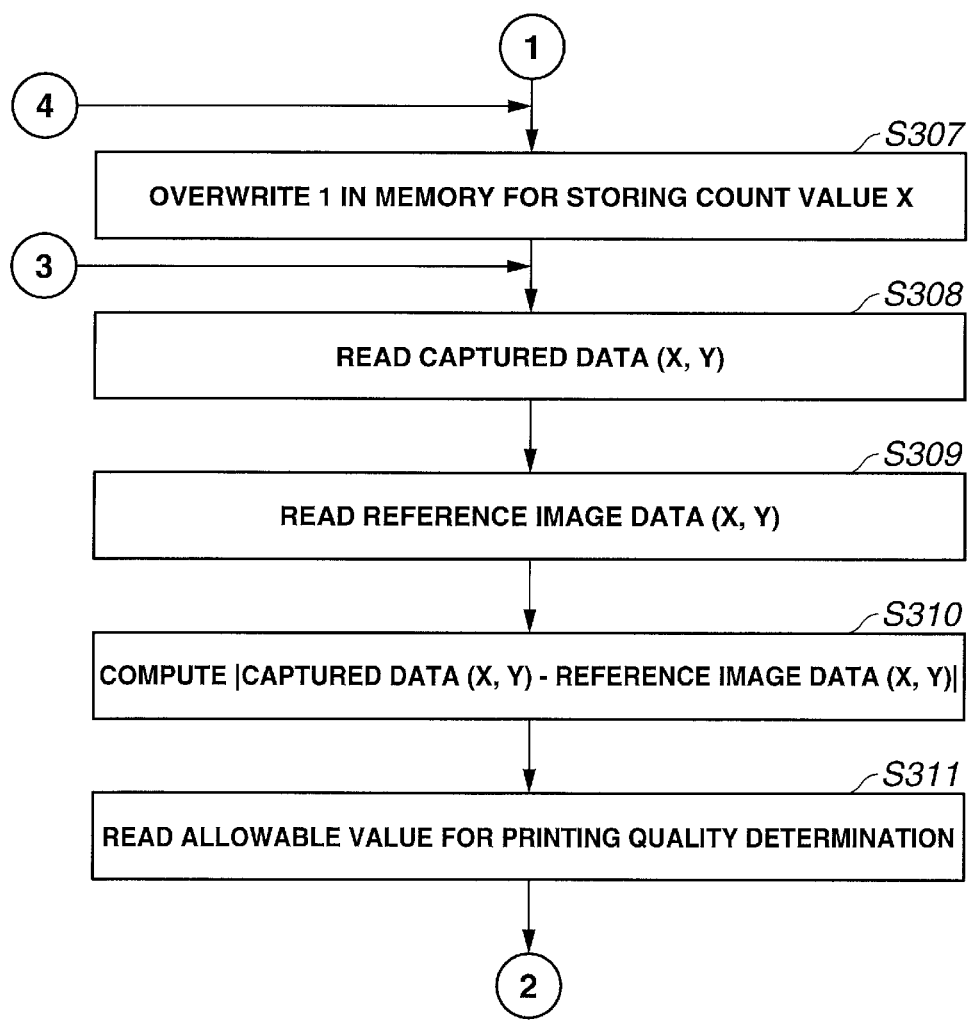
Figure 17C:
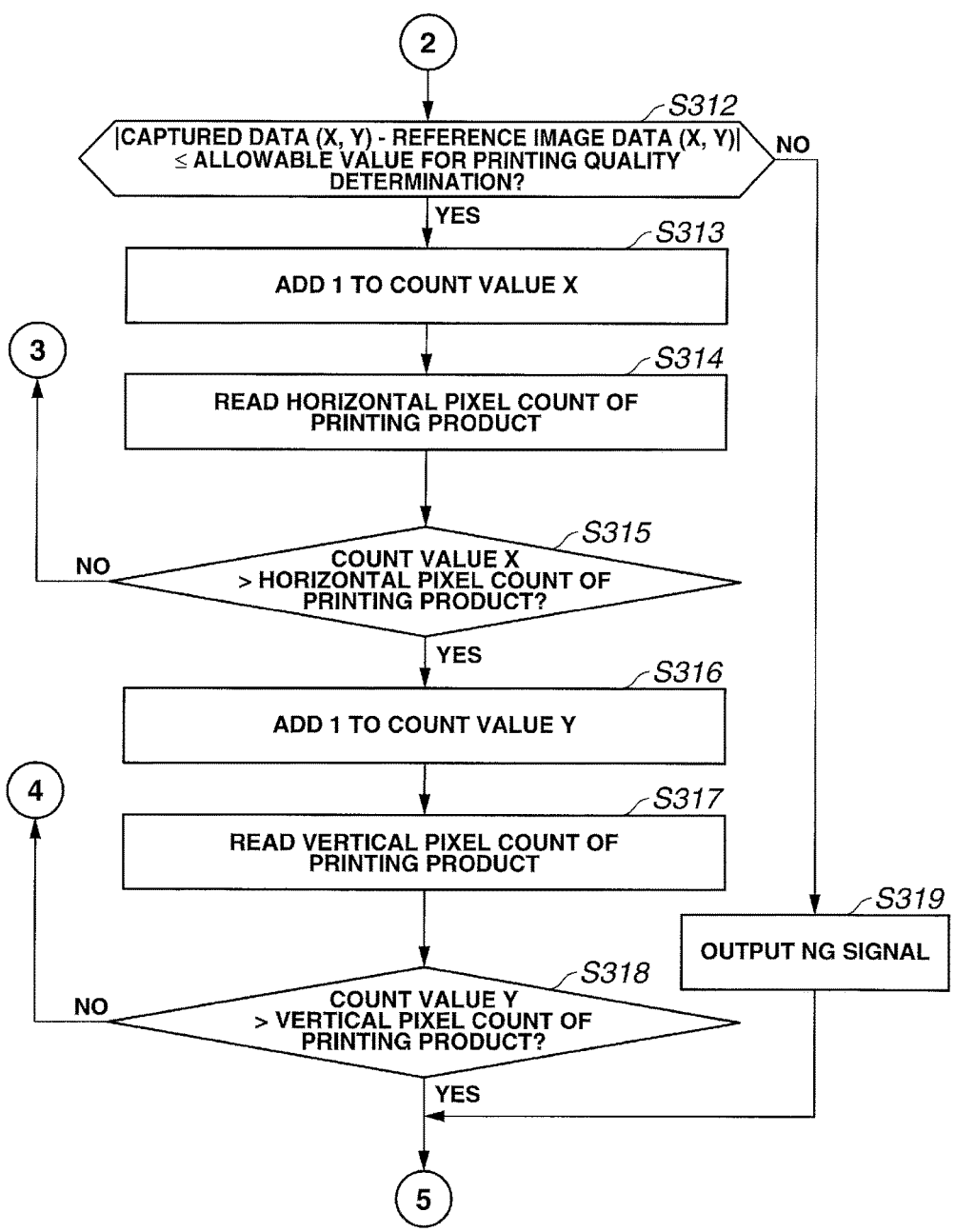
Figure 17D:
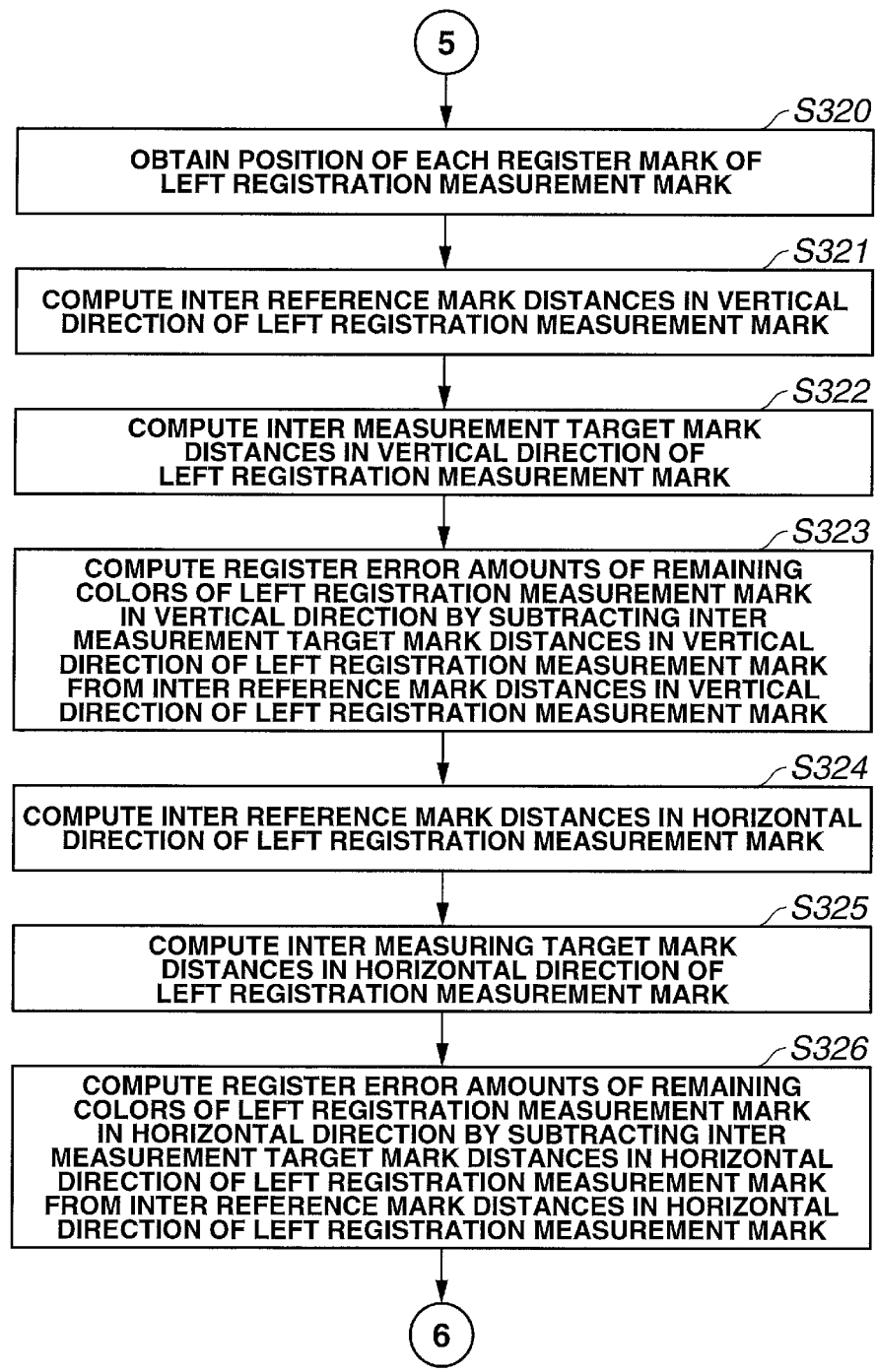

The CPU 21 then writes 1 as a count value Y in the memory M4 (step S306), and also writes 1 as a count value X in the memory M5 (step S307 in FIG. 17B). The CPU 21 reads captured data (captured data (X, Y)) at the position of (X, Y) from the memory M3 (step S308).

Subsequently, the CPU 21 reads reference image data (reference image data (X, Y)) at the position of (X, Y) from the memory M6 storing printing quality inspection images as reference images (step S309), and computes |captured data (X, Y)−reference image data (X, Y)|, that is, the absolute value of the difference between the captured data at the position of (X, Y) and the reference image data at the position of (X, Y) (step S310). The CPU 21 then reads the allowable value for printing quality determination set in the memory M8 (step S311), and compares |captured data (X, Y)−reference image data (X, Y)|computed in step S310 with the allowable value for printing quality determination read in step S311 (step S312 in FIG. 17C).

In this case, if |captured data (X, Y)−reference image data (X, Y)| is equal to or less than the allowable value for printing quality determination (YES in step S312), the CPU 21 determines that the captured data (X, Y) read in step S308 satisfies required printing quality, and adds 1 to the count value X in the memory M5 (step S313). The CPU 21 then reads a horizontal pixel count w of the printing product set in the memory M9 (step S314). The CPU 21 repeats the processing operation in steps S308 to S315 until the count value X exceeds the horizontal pixel count w of the printing product (YES in step S315).

If the count value X exceeds the horizontal pixel count w of the printing product during the repetition of the processing operation in steps S308 to S315 (YES in step S315), the CPU 21 adds 1 to the count value Y in the memory M4 (step S316), and reads a vertical pixel count h of the printing product set in the memory M10 (step S317). The CPU 21 then repeats the processing operation in steps S307 to S318 until the count value Y exceeds the vertical pixel count h of the printing product (YES in step S318).

If the count value Y exceeds the vertical pixel count h of the printing product (YES in step S318), the CPU 21 determines that all the captured image data (X, Y) of the captured image stored in the memory M3 satisfies required printing quality. The process then shifts to a processing operation according to the next register error amount detection program.

Note that upon determining that |captured data (X, Y)−reference image data (X, Y)| is larger than the allowable value for printing quality determination during the processing operation according to this printing quality inspection program (NO in step S312), the CPU 21 outputs an NG signal (step S319), and shifts to a processing operation according to the register error amount detection program.

[Processing Operation According to Register Error Amount Detection Program]
[Calculation of Register Error Amounts of Remaining Colors from Left Registration Measurement Mark MP1]

Upon shifting to a processing operation according to the register error amount detection program, the CPU 21 obtains the positions of register marks P0 to P7 of the left registration measurement mark MP1 on the captured image stored in the memory M3 by techniques such as template matching and sub-pixel estimation described above (step S320 in FIG. 17D).

The CPU 21 then obtains inter reference mark distances P0-P1, P0-P2, and P0-P3 in the vertical direction (Y direction) in the left registration measurement mark MP1 from the positions of the register marks P0 to P7 of the left registration measurement mark MP1 obtained in step S320 (step S321). The CPU 21 also obtains inter measurement target mark distances P4-P5, P4-P6, and P4-P7 in the vertical direction (Y direction) in the left registration measurement mark MP1 (step S322).

The CPU 21 then obtains a register error amount $\Delta y1$ ($\Delta y1L$) of "cyan" with reference to "black" in the vertical direction (Y direction) as the difference between the inter measurement target mark distance P4-P5 and the inter reference mark distance P0-P1 in the left registration measurement mark MP1, obtains a register error amount $\Delta y2$ ($\Delta y2L$) of "magenta" with reference to "black" in the vertical direction (Y direction) as the difference between the inter measurement target mark distance P4-P6 and the inter reference mark distance P0-P2 in the left registration measurement mark MP1, and obtains a register error amount $\Delta y3$ ($\Delta y3L$) of "yellow" with reference to "black" in the vertical direction (Y direction) as the difference between the inter measurement target mark distance P4-P7 and the inter reference mark distance P0-P3 in the left registration measurement mark MP1 (step S323).

The CPU 21 then obtains an inter reference mark distance P0-P4 in the horizontal direction (X direction) in the left registration measurement mark MP1 from the positions of the register marks P0 to P7 of the left registration measurement mark MP1 obtained in step S320 (step S324). The CPU 21 also obtains inter measurement target mark distances P1-P5, P2-P6, and P3-P7 in the horizontal direction (X direction) in the left registration measurement mark MP1 (step S325).

The CPU 21 then obtains a register error amount $\Delta x1$ ($\Delta x1L$) of "cyan" with reference to "black" in the horizontal direction (X direction) as the difference between the inter measurement target mark distance P1-P5 and the inter reference mark distance P0-P4 in the left registration measurement mark MP1, obtains a register error amount $\Delta x2$ ($\Delta x2L$) of "magenta" with reference to "black" in the horizontal direction (X direction) as the difference between the inter measurement target mark distance P2-P6 and the inter reference mark distance P0-P4, and obtains a register error amount $\Delta x3$ ($\Delta x3L$) of "yellow" with reference to "black" in the horizontal direction (X direction) as the difference between the inter measurement target mark distance P3-P7 and the inter reference mark distance P0-P4 (step S326).

[Calculation of Register Error Amounts of Remaining Colors from Right Registration Measurement Mark MP2]

Figure 17E:
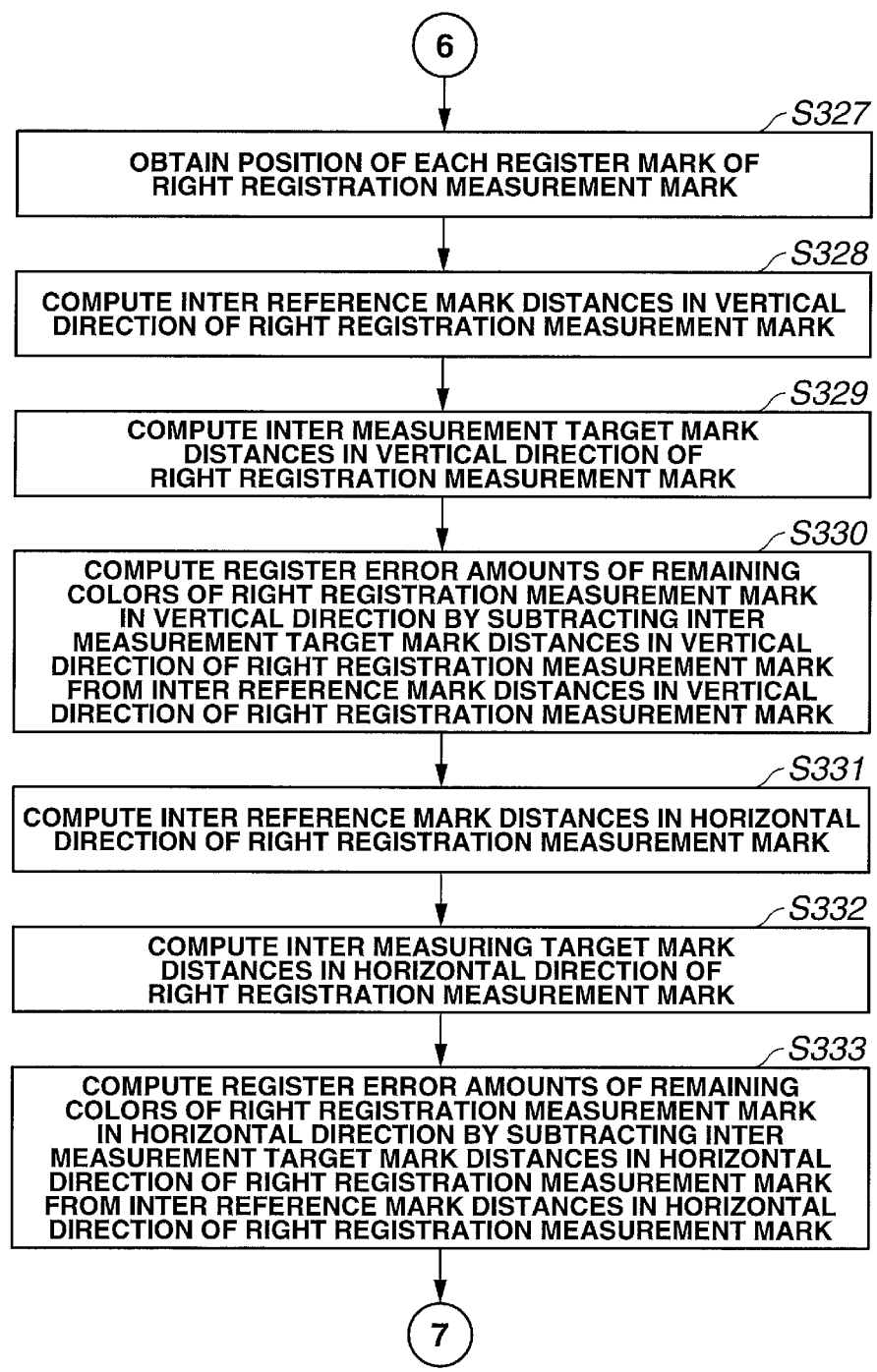

The CPU 21 obtains the positions of register marks P0 to P7 of the right registration measurement mark MP2 on the captured image stored in the memory M3 by techniques such as template matching and sub-pixel estimation in the same manner as in the case of the left registration measurement mark MP1 (step S327 in FIG. 17E).

The CPU 21 then obtains inter reference mark distances P0-P1, P0-P2, and P0-P3 in the vertical direction (Y direction) in the right registration measurement mark MP2 from the positions of the register marks P0 to P7 of the right registration measurement mark MP2 obtained in step S327 (step S328). The CPU 21 also obtains inter measurement target mark distances P4-P5, P4-P6, and P4-P7 in the vertical direction (Y direction) in the right registration measurement mark MP2 (step S329).

The CPU 21 then obtains a register error amount $\Delta y1$ ($\Delta y1R$) of "cyan" with reference to "black" in the vertical direction (Y direction) as the difference between the inter measurement target mark distance P4-P5 and the inter reference mark distance P0-P1 in the right registration measurement mark MP2, obtains a register error amount $\Delta y2$ ($\Delta y2R$) of "magenta" with reference to "black" in the vertical direction (Y direction) as the difference between the inter measurement target mark distance P4-P6 and the inter reference mark distance P0-P2, and obtains a register error amount $\Delta y3$ ($\Delta y3R$) of "yellow" with reference to "black" in the vertical direction (Y direction) as the difference between the inter measurement target mark distance P4-P7 and the inter reference mark distance P0-P3 (step S330).

The CPU 21 then obtains an inter reference mark distance P0-P4 in the horizontal direction (X direction) in the right registration measurement mark MP2 from the positions of the register marks P0 to P7 of the right registration measurement mark MP2 obtained in step S327 (step S331). The CPU 21 also obtains inter measurement target mark distances P1-P5, P2-P6, and P3-P7 in the horizontal direction (X direction) in the right registration measurement mark MP2 (step S332).

The CPU 21 then obtains a register error amount $\Delta x1$ ($\Delta x1R$) of "cyan" with reference to "black" in the horizontal direction (X direction) as the difference between the inter measurement target mark distance P1-P5 and the inter reference mark distance P0-P4 in the right registration measurement mark MP2, obtains a register error amount $\Delta x2$ ($\Delta x2R$) of "magenta" with reference to "black" in the horizontal direction (X direction) as the difference between the inter measurement target mark distance P2-P6 and the inter reference mark distance P0-P4, and obtains a register error amount $\Delta x3$ ($\Delta x3R$) of "yellow" with reference to "black" in the horizontal direction (X direction) as the difference between the inter measurement target mark distance P3-P7 and the inter reference mark distance P0-P4 (step S333).

[Calculation of Register Error Amounts Between Colors on Overall Printing Product (Vertical Direction/Horizontal Direction/Twisting Direction)]

Figure 17F:
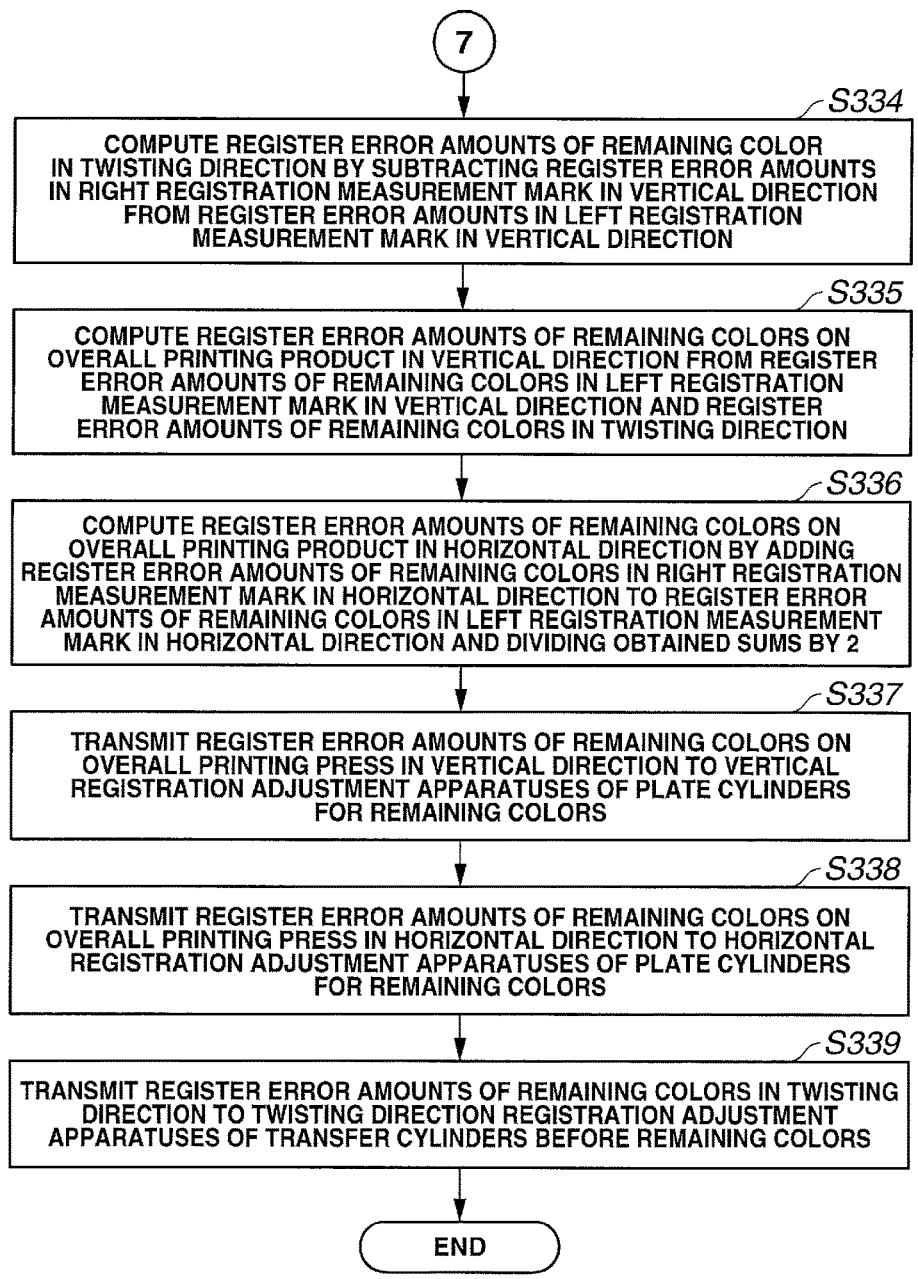

The CPU 21 then subtracts the register error amounts $\Delta y1R$, $\Delta y2R$, and $\Delta y3R$ of "cyan", "magenta", and "yellow" in the right registration measurement mark MP2 in the vertical direction (Y direction) from the register error amounts $\Delta y1L$, $\Delta y2L$, and $\Delta y3L$ of "cyan", "magenta", and "yellow" in the left registration measurement mark MP1 in the vertical direction (Y direction) ($\Delta y1L-\Delta y1R$, $\Delta y2L-\Delta y2R$, and $\Delta y3L-\Delta y3R$), and obtains register error amounts $\Delta z1$, $\Delta z2$, and $\Delta z3$ of the respective colors "cyan", "magenta", and "yellow" in the twisting direction from the obtained subtraction values (step S334 in FIG. 17F).

In addition, the CPU 21 obtains the register error amounts $\Delta y1$, $\Delta y2$, and $\Delta y3$ of "cyan", "magenta", and "yellow" on the overall printing product in the vertical direction (Y direction) from the register error amounts $\Delta y1L$, $\Delta y2L$, and $\Delta y3L$ of the respective colors "cyan", "magenta", and "yellow" in the left registration measurement mark MP1 in the vertical direction (Y direction) and the register error amounts $\Delta z1$, $\Delta z2$, and $\Delta z3$ of the respective colors "cyan", "magenta", and "yellow" in the twisting direction obtained in step S334 (step S335).

Furthermore, the CPU 21 adds the register error amounts $\Delta x1R$, $\Delta x2R$, and $\Delta x3R$ of the respective colors "cyan", "magenta", and "yellow" in the right registration measurement mark MP2 to the register error amounts $\Delta x1L$, $\Delta x2L$, and $\Delta x3L$ of the respective colors "cyan", "magenta", and "yellow" in the left registration measurement mark MP1 in the horizontal direction (X direction), and divides the obtained sums by 2 to obtain the register error amounts $\Delta x1$, $\Delta x2$, and $\Delta x3$ of the respective colors "cyan", "magenta", and "yellow" on the whole printing product in the horizontal direction (X direction) (step S336).

The CPU 21 then respectively transmits the register error amounts $\Delta y1$, $\Delta y2$, and $\Delta y3$ of the respective colors "cyan", "magenta", and "yellow" in the vertical direction (Y direction) obtained in step S335 to vertical registration adjustment apparatuses 40 of the plate cylinders 16 for the respective colors "cyan", "magenta", and "yellow" (step S337).

In addition, the CPU 21 respectively transmits the register error amounts $\Delta x1$, $\Delta x2$, and $\Delta x3$ of the respective colors "cyan", "magenta", and "yellow" in the horizontal direction (X direction) obtained in step S336 to horizontal registration adjustment apparatuses 41 of the plate cylinders 16 for the respective colors "cyan", "magenta", and "yellow" (step S338).

Furthermore, the CPU 21 then respectively transmits the register error amounts $\Delta z1$, $\Delta z2$, and $\Delta z3$ of the respective colors "cyan", "magenta", and "yellow" in the twisting direction obtained in step S334 to twisting registration adjustment apparatuses 42 of the transfer cylinders for the respective colors "cyan", "magenta", and "yellow" (step S339).

Figure 18:
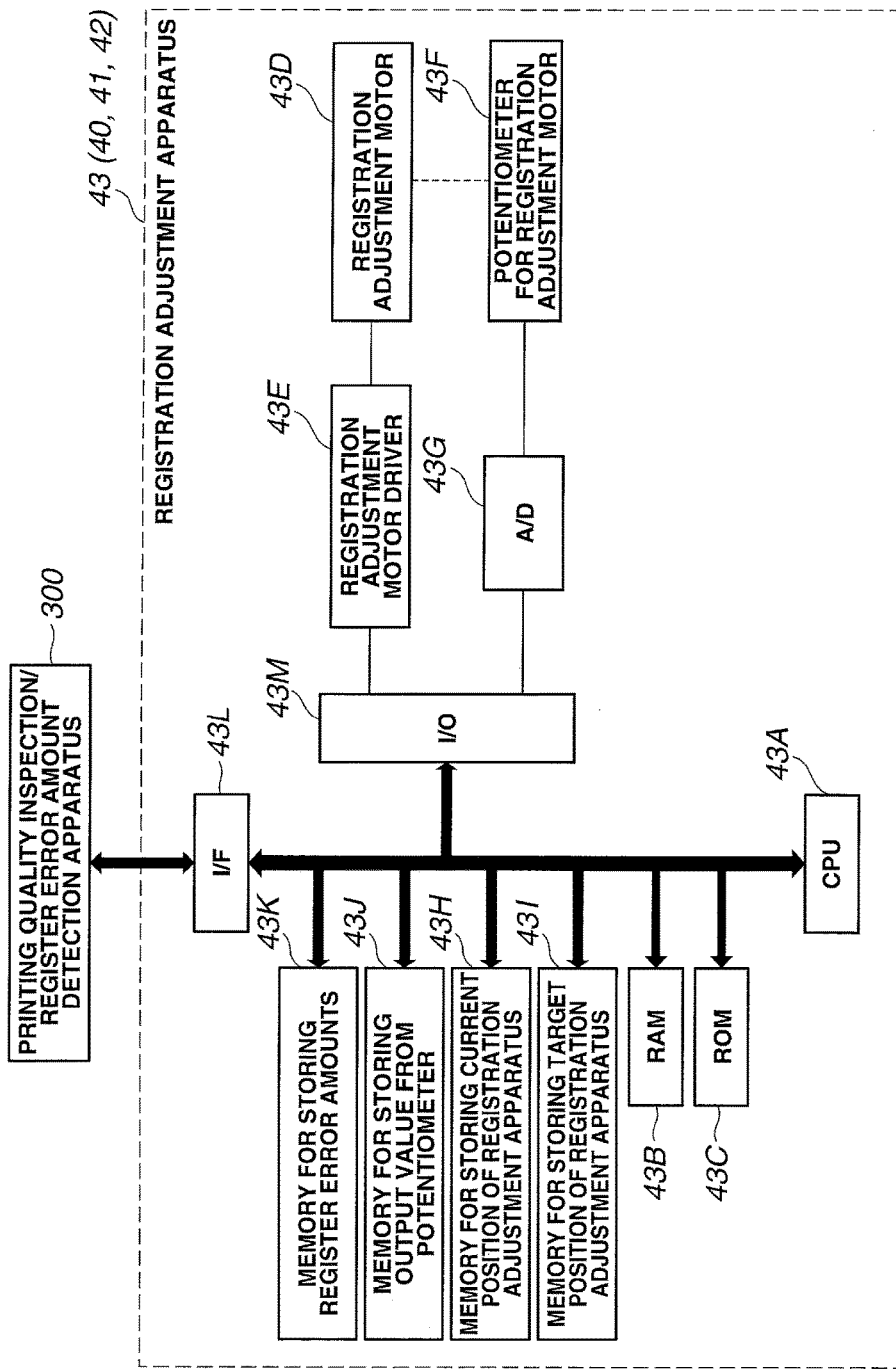
FIG. 18 is a block diagram showing the main part of a registration adjustment apparatus as a representative of a horizontal direction registration adjustment apparatus, a horizontal registration adjustment apparatus, and a twisting direction registration adjustment apparatus connected to the printing quality inspection/register error amount detection apparatus shown in FIG. 14.
Figure 20:
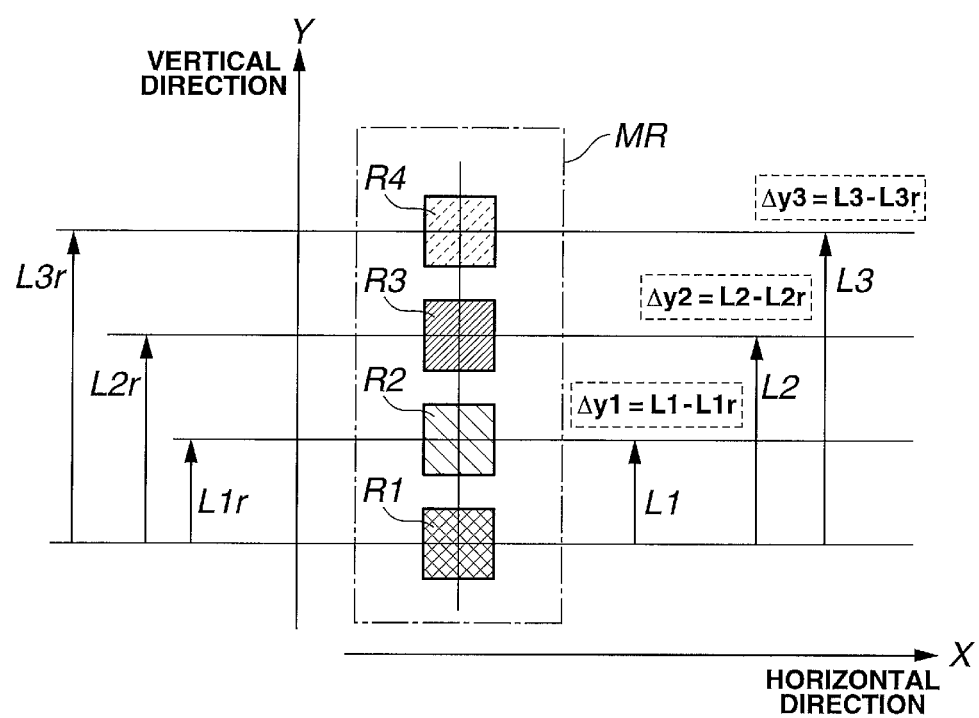
FIG. 20 is a view showing an example of a related registration adjustment mark.

The vertical registration adjustment apparatus 40, the horizontal registration adjustment apparatus 41, and the twisting registration adjustment apparatus 42 have the same arrangement. FIG. 18 therefore shows the arrangement of a registration adjustment apparatus 43 as a representative of the vertical registration adjustment apparatus 40, the horizontal registration adjustment apparatus 41, and the twisting registration adjustment apparatus 42.

The registration adjustment apparatus 43 includes a CPU 43A, a RAM 43B, a ROM 43C, a registration adjustment motor 43D, a registration adjustment motor driver 43E, a potentiometer (registration adjustment motor potentiometer) 43F attached to the registration adjustment motor 43D, an A/D converter 43G, a memory 43H for storing the current position of the registration adjustment apparatus, a memory 43I for storing the target position of the registration adjustment apparatus, a memory 43J for storing an output value from the potentiometer, a memory 43K for storing register error amounts, and input/output interfaces (I/O I/Fs) 43L and 43M. The printing quality inspection/register error amount detection apparatus 300 is connected to the interface 43L.

The operation of the registration adjustment apparatus 43 will be described with reference to the flowcharts shown in FIGS. 19A and 19B. In this case, register error amounts in the vertical, horizontal, and twisting directions will be collectively referred to as register error amounts.

Upon receiving register error amounts sent from the printing quality inspection/register error amount detection apparatus 300 (YES in step S401 in FIG. 19A), the CPU 43A stores the sent register error amounts in the memory 43K (step S402).

The CPU 43A reads the current output value from the potentiometer 43F for the registration adjustment motor via the A/D converter 43G, and stores the output values in the memory 43J (step S403). The CPU 43A reads out the current output value from the potentiometer 43F for the registration adjustment motor from the memory 43J, computes the current position of the registration adjustment apparatus from the readout output value, and stores the resultant data in the memory 43H (step S404).

The CPU 43A reads out a register error amount from the memory 43K (step S405). The CPU 43A then adds the register error amount to the current position of the registration adjustment apparatus in the memory 43H to compute the target position of the registration adjustment apparatus, and stores the resultant data in the memory 43I (step S406). The CPU 43A then reads out the current position of the registration adjustment apparatus in the memory 43H (step S407), and compares it with the target position of the registration adjustment apparatus in the memory 43I (step S408). If the target position of the registration adjustment apparatus does not match the current position of the registration adjustment apparatus (NO in step S408), the CPU 43A checks the magnitude relationship between the target position of the registration adjustment apparatus and the current position of the registration adjustment apparatus (step S409 in FIG. 19B).

If the current position of the registration adjustment apparatus is smaller than the target position of the registration adjustment apparatus (YES in step S409), the CPU 43A sends a forward rotation command to the registration adjustment motor driver 43E (step S410). If the current position of the registration adjustment apparatus is larger than the target position of the registration adjustment apparatus (NO in step S409), the CPU 43A sends a reverse rotation command to the registration adjustment motor driver 43E (step S411).

The CPU 43A reads the current output value from the potentiometer 43F for the registration adjustment motor via the A/D converter 43G (step S412), and computes the current position of the registration adjustment apparatus from the read output value (step S413). The CPU 43A reads the target position of the registration adjustment apparatus from the memory 43I (step S414), and compares it with the current position of the registration adjustment apparatus (step S415). The CPU 43A repeats the processing operation in steps S412 to S415 until the current position of the registration adjustment apparatus matches the target position of the registration adjustment apparatus (YES in step S415).

When the current position of the registration adjustment apparatus matches the target position of the registration adjustment apparatus (YES in step S415), the CPU 43A outputs a stop command to the registration adjustment motor driver 43E to stop the rotation of the registration adjustment motor 43D (step S416).

The first to third embodiments described above use the cameras 10 and 27 of the printing quality inspection apparatuses 3 as image capturing apparatuses. However, it is not always necessary to use the cameras 10 and 27 of the printing quality inspection apparatuses 3. For example, a dedicated camera may be used as an image capturing apparatus to capture an image of only a narrow region including the registration measurement marks MP, MP1, and MP2 instead of the overall patters on the 19. In addition, it is not always necessary to use a camera designed to perform image capturing at a wide angle, and it is possible to use a high-resolution camera. Furthermore, it is possible to capture an image of a region including the registration measurement marks MP, MP1, and MP2 offline instead of inline.

[Conclusion]

The register error amount detection apparatuses 100 and 200 described above respectively include the captured image reading units 101 and 201 and the register error amount detection units 102 and 202. The captured image reading units 101 and 201 each read a captured image from an image capturing apparatus 10 which captures an image of a region including the registration measurement mark MP printed in the margin of the printing product. The register error amount detection units 102 and 202 each obtain the register error amounts between the colors of the patterns printed on the printing product based on the positions of (the register marks P0 to P7) of the registration measurement mark MP on the read captured image.

The registration measurement mark MP includes the first register mark group G1 and the second register mark group G2. The first register mark group G1 includes the plurality of first register marks P4 to P7 of different colors including a reference color. The plurality of first register marks P4 to P7 are printed in a line at the intervals a in the first direction which is the vertical direction or horizontal direction of a printing product. The second register mark group G2 includes the plurality of second register marks P0 to P3 of the reference color. The plurality of second register marks P0 to P3 are printed in a line at the predetermined intervals a in the first direction at the positions translated from the positions of the plurality of first register marks P4 to P7 by the predetermined distance b in the second direction perpendicular to the first direction. The number of the plurality of second register marks P0 to P3 is equal to the number of the plurality of first register marks P4 to P7. The number is not limited to four and may be two or more. In the above embodiments, the reference color is black, but the reference color may be another color. The remaining colors may not be cyan, magenta, and yellow.

The register error amount detection unit 102 of the register error amount detection apparatus 100 includes the first register error amount detection unit 102-1 and the second register error amount detection unit 102-2. The first register error amount detection unit 102-1 obtains the register error amounts between the colors in the first direction from the distances P4-P5, P4-P6, P4-P7, P0-P1, P0-P2, and P0-P3. The distances P4-P5, P4-P6, and P4-P7 are those between the first register mark P4 of the reference color and the first register marks P5 to P7 of the remaining colors. The distances P0-P1, P0-P2, and P0-P3 are those between the second register mark P0 at the position translated from the position of the first register mark P4 of the reference color in the second direction and the second register marks P1 to P3 at the positions translated from the positions of the first register marks P5 to P7 of the remaining colors in the second direction.

The second register error amount detection unit 102-2 obtains the register error amounts between the colors in the second direction from the distances P0-P4, P1-P5, P2-P6, and P3-P7. The distance P0-P4 is that between the first register mark P4 of the reference color and the second register mark P0 at the position translated from the position of the register mark P4 in the second direction. The distances P1-P5, P2-P6, and P3-P7 are those between the first register marks P5 to P7 of the remaining colors and the second register marks P1 to P3 at the positions translated from the positions of the register marks P5 to P7 in the second direction.

Although not shown, the register error amount detection unit 202 of the register error amount detection apparatus 200 includes the third register error amount detection unit which obtains the register error amounts between the colors in the twisting direction in addition to the first register error amount detection unit which obtains the register error amounts between the colors in the first direction and the second register error amount detection unit which obtains the register error amounts between the colors in the second direction. Note that the register error amount detection apparatuses 100 and 200 can be formed from, for example, CPUs.

The printing quality inspection/register error amount detection apparatus 300 described above can implement the functions of the captured image reading unit and the register error amount detection units (the first to third register error amount detection units) by causing the CPU 21 to operate in accordance with programs. The function of the captured image reading unit corresponds to step S305. The functions of the register error amount detection units (the first to third register error amount detection units) correspond to steps S320 to S336.

[Extension of Embodiments]

The present invention is not limited to the first to third embodiments. Various changes which can be understood by those skilled in the art can be made in the arrangements and details of the present invention within the technical scope of the present invention.

INDUSTRIAL APPLICABILITY

The present invention can be used for, for example, a registration adjustment apparatus which adjusts the rotational phase, horizontal position, and the like of the plate cylinder 16 in the printing unit 1 of each of a plurality of colors in a printing press.

What is claimed is:

1. A register error amount detection method comprising: reading a captured image from an image capturing apparatus which captures an image of a region including a registration measurement mark printed in a margin of a printing product, the registration measurement mark including a first register mark group including a plurality of first register marks of different colors including a reference color and a second register mark group including a plurality of second register marks of the reference color, the plurality of second register marks being equal in number to the plurality of first register marks, the plurality of first register marks being printed in a line at predetermined intervals in a first direction which is a vertical direction or horizontal direction of the printing product, and the plurality of second register marks being printed in a line at the predetermined intervals in the first direction at positions translated from the positions of the plurality of first register marks by a predetermined distance in a second direction perpendicular to the first direction; and obtaining register error amounts between colors of patterns printed on the printing product based on positions of the plurality of first register marks and the plurality of second register marks in the read captured image.

2. The method according to claim 1, wherein said obtaining register error amounts includes obtaining register error amounts between colors in the first direction from distances between the first register mark of the reference color and the first register marks of remaining colors and distances between the second register mark at a position translated from a position of the first register mark of the reference color in the second direction and the second register marks at positions translated from positions of the first register marks of the remaining colors in the second direction, and obtaining register error amounts between the colors in the second direction from a distance between the first register mark of the reference color and the second register mark at a position translated from the position of the first register mark of the reference color in the second direction and distances between the first register marks of the remaining colors and the second register marks at positions translated from the positions of the first register marks of the remaining colors in the second direction.

3. The method according to claim 1, wherein the image capturing apparatus comprises an image capturing apparatus of a printing quality inspection apparatus which captures an image of a region including a whole of the patterns printed on the printing product and inspects quality of the patters printed on the printing product by comparing the captured image data of the patterns with reference image data stored in advance for each pixel.

4. The method according to claim 1, wherein each of the plurality of first register marks and the plurality of second register marks have a square shape.

5. The method according to claim 1, wherein the each of plurality of first register marks and the plurality of second register marks have a rectangular shape.

6. The method according to claim 1, wherein each of the plurality of first register marks and the plurality of second register marks have a rhombic shape.

7. The method according to claim 1, wherein each of the plurality of first register marks and the plurality of second register marks have a circular shape.

8. The method according to claim 1, wherein the obtaining register error amounts includes obtaining, as the register error amounts between the colors, register error amounts of remaining colors with respect to the reference color by using image data complementary to the remaining colors.

9. A register error amount detection apparatus comprising: A captured image reader that reads a captured image from an image capturing apparatus which captures an image of a region including a registration measurement mark printed in a margin of a printing product, the registration measurement mark including a first register mark group including a plurality of first register marks of different colors including a reference color and a second register mark group including a plurality of second register marks of the reference color, the plurality of second register marks being equal in number to the plurality of first register marks, the plurality of first register marks being printed in a line at predetermined intervals in a first direction which is a vertical direction or horizontal direction of the printing product, and the plurality of second register marks being printed in a line at the predetermined intervals in the first direction at positions translated from the positions of the plurality of first register marks by a predetermined distance in a second direction perpendicular to the first direction; and a register error amount detector that obtains register error amounts between colors of patterns printed on the printing product based on positions of the plurality of first register marks and the plurality of second register marks in the read captured image.

10. The apparatus according to claim 9, wherein the register error amount detector includes a first register error amount detector that obtains register error amounts between colors in the first direction from distances between the first register mark of the reference color and the first register marks of remaining colors and distances between the second register mark at a position translated from a position of the first register mark of the reference color in the second direction and the second register marks at positions translated from positions of the first register marks of the remaining colors in the second direction, and a second register error amount detector that obtains register error amounts between the colors in the second direction from a distance between the first register mark of the reference color and the second register mark at a position translated from the position of the first register mark of the reference color in the second direction and distances between the first register marks of the remaining colors and the second register marks at positions translated from the positions of the first register marks of the remaining colors in the second direction.

11. The apparatus according to claim 9, wherein the image capturing apparatus comprises an image capturing apparatus of a printing quality inspection apparatus which captures an image of a region including a whole of the patterns printed on the printing product and inspects quality of the patters printed on the printing product by comparing the captured image data of the patterns with reference image data stored in advance for each pixel.

12. The apparatus according to claim 9, wherein each of the plurality of first register marks and the plurality of second register marks have a square shape.

13. The apparatus according to claim 9, wherein each of the plurality of first register marks and the plurality of second register marks have a rectangular shape.

14. The apparatus according to claim 9, wherein each of the plurality of first register marks and the plurality of second register marks have a rhombic shape.

15. The apparatus according to claim 9, wherein each of the plurality of first register marks and the plurality of second register marks have a circular shape.

16. The apparatus according to claim 9, wherein the register error amount detector includes a first register error amount detector and a second register error amount detector that obtain, as the register error amounts between the colors, register error amounts of remaining colors with respect to the reference color by using image data complementary to the remaining colors.

* * * * *